US011326732B2

(12) United States Patent
Botts et al.

(10) Patent No.: US 11,326,732 B2
(45) Date of Patent: *May 10, 2022

(54) UNDERGROUND PIPE REPAIR DEVICE WITH DETECTABLE ANNULAR BODY AND RELATED SYSTEMS AND METHODS

(71) Applicant: IMPROVED INFRASTRUCTURE SOLUTIONS, LLC, Winter Park, FL (US)

(72) Inventors: Jerold L. Botts, Orlando, FL (US); Cleatous J. Simmons, Winter Park, FL (US)

(73) Assignee: Improved Infrastructure Solutions, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,856

(22) Filed: Sep. 11, 2020

(65) Prior Publication Data

US 2020/0408348 A1 Dec. 31, 2020

Related U.S. Application Data

(63) Continuation-in-part of application No. 16/689,266, filed on Nov. 20, 2019, now Pat. No. 11,035,514, (Continued)

(51) Int. Cl.
*F16L 55/18* (2006.01)
*F16L 55/165* (2006.01)

(52) U.S. Cl.
CPC ............ *F16L 55/18* (2013.01); *F16L 55/165* (2013.01); *F16L 2201/60* (2013.01)

(58) Field of Classification Search
CPC ..... F16L 55/18; F16L 55/165; F16L 55/1652; F16L 55/1653; F16L 55/1656; F16L 55/179; F16L 2201/60
(Continued)

(56) References Cited

U.S. PATENT DOCUMENTS 5,036,210 A * 7/1991 Goodman ............... B29C 48/09
235/493
5,197,540 A * 3/1993 Yagi ....................... F16L 55/179
166/55.8

(Continued)

FOREIGN PATENT DOCUMENTS

GB 2157796 A * 10/1985 ............... B26D 5/36

OTHER PUBLICATIONS

Hasan et al. "The Myth, the Fact, and the Legend: Insignia Hydrophilic Sealing System" LMK Technologies, LLC Copyright 2012; Originally published in Trenchless International Magazine, Oct. 2012 pp. 3.

*Primary Examiner* — Frederick L Lagman
(74) *Attorney, Agent, or Firm* — Allen, Dyer, Doppelt + Gilchrist, PA

(57) ABSTRACT

An underground pipe repair device is for a joint between a service pipe and a branch pipe. The underground pipe repair device may include a T-shaped joint liner having a base portion extending laterally in the service pipe, and an arm portion extending vertically into the branch pipe, the base portion including a first base surface facing the service pipe, and a second base surface opposite the first base surface. The underground pipe repair device may include an annular body aligned with an opening for the branch pipe and coupled to the second base surface of the T-shaped joint liner. The annular body may have a physical characteristic to be detected by a robot device within the service pipe.

20 Claims, 18 Drawing Sheets

Related U.S. Application Data which is a continuation of application No. 16/164,008, filed on Oct. 18, 2018, now Pat. No. 10,514,125, which is a continuation-in-part of application No. 15/943,837, filed on Apr. 3, 2018, now Pat. No. 10,309,575, which is a continuation-in-part of application No. 15/485,444, filed on Apr. 12, 2017, now Pat. No. 9,933,105.

(58) Field of Classification Search
USPC .......................................................... 405/157
See application file for complete search history.

(56) References Cited

U.S. PATENT DOCUMENTS

| | | | | |
|---|---|---|---|---|
| 5,329,063 | A | 7/1994 | Endoh | |
| 5,439,033 | A | 8/1995 | Kamiyama et al. | |
| 5,454,401 | A | 10/1995 | Kamiyama et al. | |
| 5,566,719 | A | 10/1996 | Kamiyama et al. | |
| 5,577,864 | A * | 11/1996 | Wood | F16L 55/179 405/184.2 |
| 5,598,873 | A | 2/1997 | Kamiyama et al. | |
| 5,609,439 | A * | 3/1997 | Schreiner | F16L 55/265 405/184.2 |
| 5,916,406 | A | 6/1999 | Kamiyama et al. | |
| 5,944,058 | A | 8/1999 | Kamiyama et al. | |
| 5,971,031 | A | 10/1999 | Kamiyama et al. | |
| 6,006,787 | A | 12/1999 | Kamiyama et al. | |
| 6,085,794 | A | 7/2000 | Kamiyama et al. | |
| 6,092,558 | A * | 7/2000 | Maccario | F16L 1/11 116/209 |
| 6,103,052 | A | 8/2000 | Kamiyama et al. | |
| 6,123,109 | A | 9/2000 | Kamiyama et al. | |
| 6,152,184 | A | 11/2000 | Kamiyama et al. | |
| 6,158,473 | A | 12/2000 | Kamiyama et al. | |
| 6,994,118 | B2 | 2/2006 | Kiest, Jr. et al. | |
| 7,028,716 | B2 | 4/2006 | Kaneta et al. | |
| 7,121,305 | B2 | 10/2006 | Kaneta et al. | |
| 7,398,797 | B2 | 7/2008 | Kamiyama et al. | |
| 7,987,873 | B2 | 8/2011 | Kiest, Jr. | |
| 8,636,036 | B2 | 1/2014 | Kiest, Jr. | |
| 8,667,992 | B2 | 3/2014 | Kiest, Jr. | |
| 8,689,835 | B2 | 4/2014 | Kiest, Jr. | |
| 9,261,221 | B2 | 2/2016 | Kiest, Jr. | |
| 9,347,212 | B2 * | 5/2016 | Bichler | E03F 7/12 |
| 9,481,974 | B2 | 11/2016 | Kiest, Jr. | |
| 9,499,955 | B2 | 11/2016 | Kiest, Jr. et al. | |
| 9,933,105 | B1 * | 4/2018 | Botts | F16L 55/179 |
| 10,309,575 | B2 * | 6/2019 | Botts | F16L 55/165 |
| 10,514,125 | B1 * | 12/2019 | Botts | F16L 55/179 |
| 11,035,514 | B1 * | 6/2021 | Botts | F16L 55/179 |
| 2006/0005893 | A1 | 1/2006 | Kaneta et al. | |
| 2006/0219311 | A1 * | 10/2006 | Kiest | G09F 3/0295 138/98 |
| 2008/0029177 | A1 | 2/2008 | Kamiyama et al. | |
| 2008/0245433 | A1 | 10/2008 | Warren | |
| 2009/0056823 | A1 | 3/2009 | Kiest, Jr. | |
| 2010/0187813 | A1 * | 7/2010 | Anders | F16L 55/265 285/204 |
| 2011/0203719 | A1 | 8/2011 | Kiest, Jr. | |
| 2012/0007714 | A1 * | 1/2012 | Muhlin | F16L 55/1653 340/10.1 |
| 2012/0084956 | A1 * | 4/2012 | Kiest, Jr. | B23P 11/022 29/402.09 |
| 2012/0261015 | A1 | 10/2012 | Warren | |
| 2013/0213513 | A1 | 8/2013 | Kiest, Jr. | |
| 2013/0249208 | A1 | 9/2013 | Kiest, Jr. | |
| 2014/0027000 | A1 * | 1/2014 | Kiest, Jr. | F16L 55/265 138/97 |
| 2015/0267375 | A1 | 9/2015 | Kiest, Jr. | |
| 2015/0377404 | A1 * | 12/2015 | Bichler | F16L 55/18 138/98 |
| 2016/0010781 | A1 | 1/2016 | Kiest, Jr. et al. | |
| 2016/0061374 | A1 * | 3/2016 | Bichler | F16L 55/265 138/97 |
| 2016/0223121 | A1 | 8/2016 | Kiest, Jr. | |
| 2016/0223122 | A1 | 8/2016 | Kiest, Jr. | |
| 2016/0348827 | A1 | 12/2016 | Kiest, Jr. et al. | |
| 2016/0348828 | A1 | 12/2016 | Mathey et al. | |
| 2017/0146178 | A1 | 5/2017 | Kiest, Jr. | |
| 2019/0277437 | A1 * | 9/2019 | Kiest, Jr. | B23P 6/04 |
| 2020/0173599 | A1 * | 6/2020 | Baxter | F16L 55/18 |

\* cited by examiner

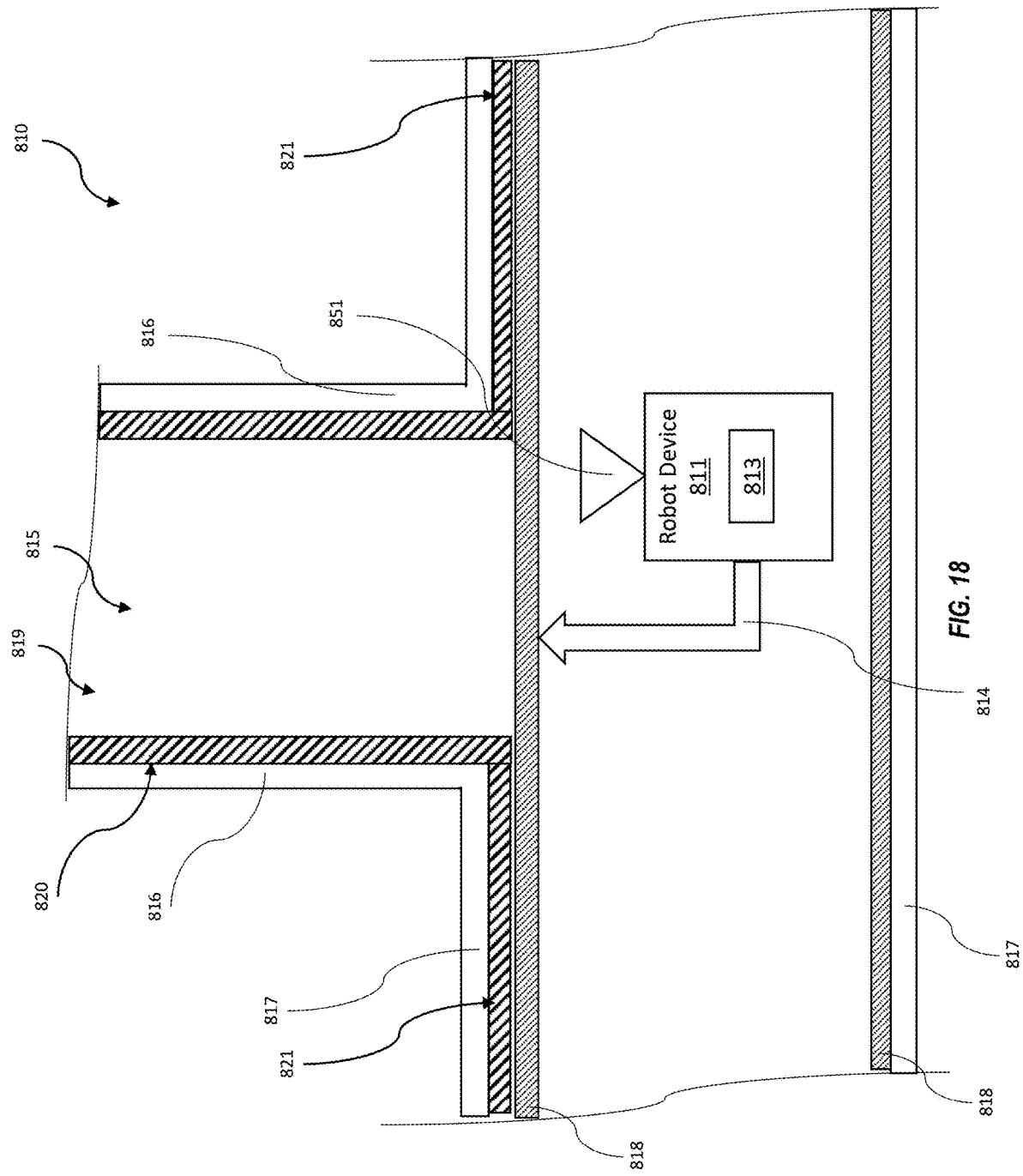

UNDERGROUND PIPE REPAIR DEVICE WITH DETECTABLE ANNULAR BODY AND RELATED SYSTEMS AND METHODS

RELATED APPLICATION

This application is a continuation-in-part of prior filed copending application Ser. No. 16/689,266 filed Nov. 20, 2019, now U.S. Pat. No. 11,035,514, which is a continuation of prior filed copending application Ser. No. 16/164,008 filed Oct. 18, 2018, now U.S. Pat. No. 10,514,125, which is a continuation-in-part of prior filed copending application Ser. No. 15/943,837 filed Apr. 3, 2018, now U.S. Pat. No. 10,309,575, which is a continuation-in-part of prior filed copending application Ser. No. 15/485,444 filed Apr. 12, 2017, now U.S. Pat. No. 9,933,105, the entire subject matter of these applications is incorporated herein by reference in its entirety.

TECHNICAL FIELD

The present disclosure relates to the field of underground pipe repair, and, more particularly, to underground sewer pipe repair devices and related methods.

BACKGROUND

Pervasive gravity based sewer systems have been the hallmark of advanced human civilization since the Roman Empire. In most modern metropolitan applications, the service sewer pipe (i.e. the "main") runs along a street, and adjacent properties each connect to the service sewer pipe via a respective branch sewer pipe. Over time, subterranean pressure and moisture cause deterioration in a joint between each branch sewer pipe and the service sewer pipe. One approach is to excavate and replace each of the branch and service sewer pipes. Of course, although functionally ideal, the approach is very expensive and disruptive to property owners.

Another approach to this issue is excavationless/trenchless repair of the branch and service sewer pipes via a relining process. In particular, the approach includes relining the joint between each branch sewer pipe and the service sewer pipe. In typical approaches to fixing a leak in the sewer connection, a new liner is applied to the service sewer pipe. The branch sewer pipe also receives a new liner. The prior art process includes applying a specially shaped liner for the joint, for example, a vertically inverted T-shaped liner that extends upward into the branch sewer pipe. The typical approach includes subsequently applying a new liner for the service sewer pipe. The problem with this approach is that the joint portion of the liner may be damaged during the application of the liner for service sewer pipe, in particular, the steps of curing the liner for the service sewer pipe and cutting an opening in that new liner of the service sewer pipe at the joint.

SUMMARY

Generally, an underground pipe repair device is for a joint between a service pipe and a branch pipe. The underground pipe repair device may include a T-shaped joint liner comprising a base portion extending laterally in the service pipe, and an arm portion extending vertically into the branch pipe, the base portion comprising a first base surface facing the service pipe, and a second base surface opposite the first base surface. The underground pipe repair device may include an annular body aligned with an opening for the branch pipe and coupled to the second base surface of the T-shaped joint liner. The annular body may have a physical characteristic to be detected by a robot device within the service pipe.

In some embodiments, the physical characteristic may comprise a ferromagnetic characteristic, and the annular body may comprise a magnetic material. In other embodiments, the physical characteristic may comprise a radio frequency identification (RFID) tag carried by the annular body.

In yet other embodiments, the physical characteristic may comprise a known electrical potential. The annular body may be coupled to a reference voltage, and the known electrical potential may comprise the reference voltage.

Also, the T-shaped joint liner may comprise a flexible curable layer abutting the second base surface. The annular body may comprise portions, each portion having a different color. The annular body may comprise a plastic frangible material, or a metallic material, for example.

Another aspect is directed to an underground pipe repair system for a joint between a service pipe and a branch pipe. The underground pipe repair system may comprise an underground pipe repair device comprising a T-shaped joint liner comprising a base portion extending laterally in the service pipe, and an arm portion extending vertically into the branch pipe. The base portion may comprise a first base surface facing the service pipe, and a second base surface opposite the first base surface. The underground pipe repair device may comprise an annular body aligned with an opening for the branch pipe and coupled to the second base surface of the T-shaped joint liner, the annular body having a physical characteristic. The underground pipe repair system may further comprise a robot device comprising a cutting tool, and a processor coupled to the cutting tool. The processor may be configured to cause the robot device to move through the service pipe and determine a position of the annular body based upon detecting the physical characteristic, and operate the cutting tool to cut an opening in a liner of the service pipe aligned with the annular body so that a portion the liner of the service pipe adjacent the opening of the branch pipe is removed.

Another aspect is directed to a method for operating an underground pipe repair system for repairing a joint between a service pipe and a branch pipe. The method may include positioning an underground pipe repair device at the joint. The underground pipe repair device may include a T-shaped joint liner comprising a base portion extending laterally in the service pipe, and an arm portion extending vertically into the branch pipe. The base portion may comprise a first base surface facing the service pipe, and a second base surface opposite the first base surface. The underground pipe repair device may include an annular body aligned with an opening for the branch pipe and coupled to the second base surface of the T-shaped joint liner, the annular body having a physical characteristic. The method may include curing the underground pipe repair device to the joint, applying and curing a liner for the service pipe, and determining a position of the annular body based upon detecting the physical characteristic, and cutting an opening in the liner of the service pipe aligned with the annular body so that a portion the liner of the service pipe adjacent the opening of the branch pipe is removed.

BRIEF DESCRIPTION OF THE DRAWINGS

FIG. 18 is a schematic diagram of an underground pipe repair device, according to another example embodiment.

DETAILED DESCRIPTION

Figure 1:
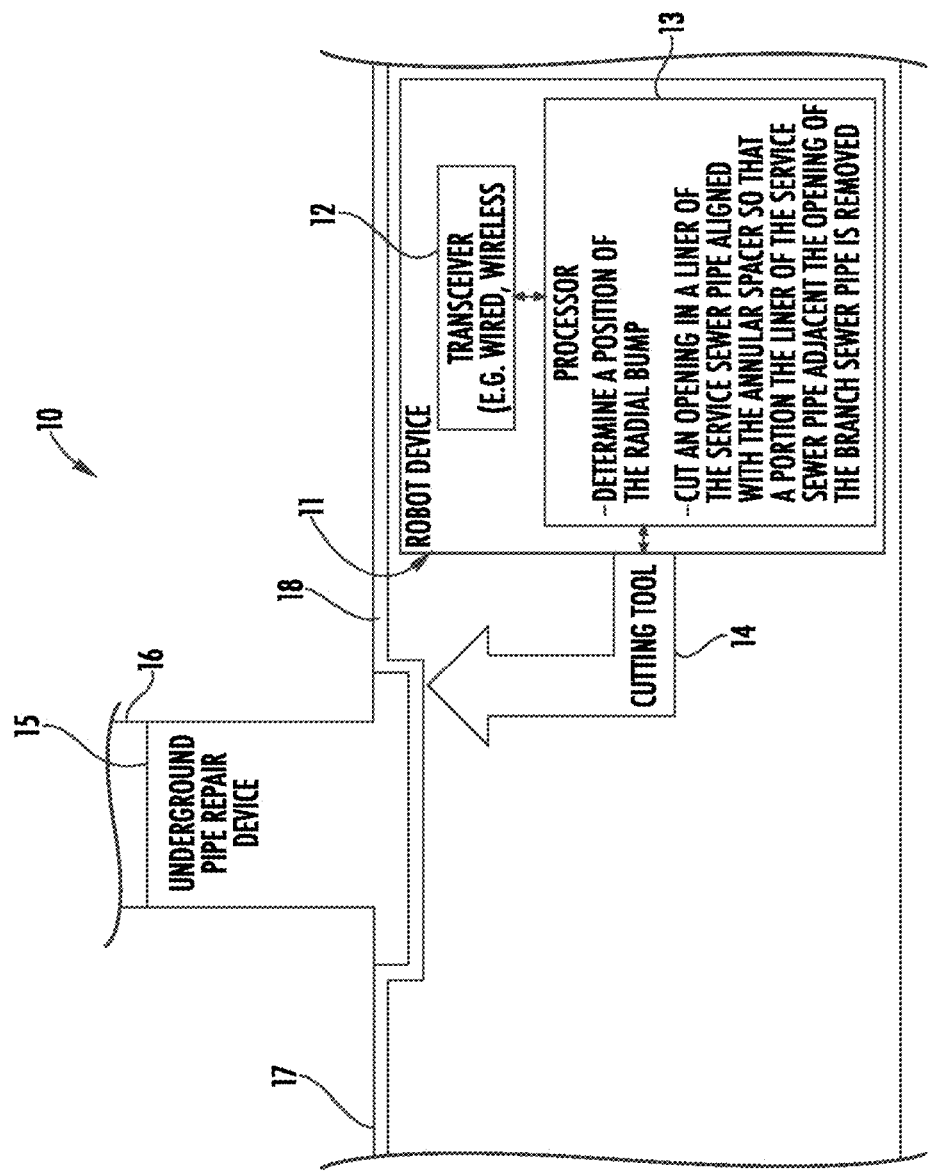
FIG. 1 is a schematic diagram of an underground pipe repair system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments. Also, base 100 reference numerals are used to indicate similar elements in alternative embodiments Referring initially to FIG. 1, an underground pipe repair system 10 for a joint between a service sewer pipe 17 and a branch sewer pipe 16. The underground pipe repair system 10 illustratively includes an underground pipe repair device 15, and a robot device 11 comprising a transceiver 12 (e.g. wired or wireless), a cutting tool 14, and a processor 13 coupled to the transceiver and the cutting tool. Although not shown, the underground pipe repair system 10 may include a surface controller configured to control operation of the robot device 11 via the transceiver 12.

The robot device 11 may include a video sensor, for example, a high definition video camera with environmental protection (e.g. water and dust proofing). The processor 13 is coupled to the video sensor, cooperates with the transceiver 12, and is configured to transmit video data from the video sensor to the controller. In some embodiments, the robot device 11 may include a battery power source coupled to the processor 13, the transceiver 12, and the cutting tool 14. In other embodiments, the robot device 11 may include a wired powered source at the surface.

The underground pipe repair device 15 illustratively includes a first T-shaped joint liner 19 having a base portion 21 extending laterally in the service sewer pipe 17, and an arm portion 20 extending vertically into the branch sewer pipe 16. In some embodiments, the base portion 21 and the arm portion 20 are integral and monolithic, but in other embodiments, the base portion 21 and the arm portion 20 may be modular and coupled together via stitching, for example.

The underground pipe repair device 15 illustratively includes a second ring-shaped liner 22 under the first T-shaped joint liner 19 and aligned with an opening in the branch sewer pipe 16. The second ring-shaped liner 22 includes a medial opening positioned over the opening in the branch sewer pipe 16.

The underground pipe repair device 15 illustratively includes an annular spacer 25 aligned with the opening in the branch sewer pipe 16 and being between the first T-shaped joint liner 19 and the second ring-shaped liner 22. The annular spacer 25 includes a radial step 26. In other embodiments, the annular spacer 25 may comprise a plurality of radial steps.

The second ring-shaped liner 22 is coupled to the base portion 21 of the first T-shaped joint liner 19 to retain the annular spacer 25. The annular spacer 25 extends vertically into the service sewer pipe 17 so that the second ring-shaped liner 22 has a radial bump 23 about the opening of the branch sewer pipe 16.

The first T-shaped joint liner 19 and the second ring-shaped liner 22 each comprises a flexible curable material. The flexible curable material may be curable via ultraviolet radiation, infrared radiation (i.e. thermal energy), a chemical immersion, or water, for example.

The processor 13 is configured to cause the robot device 11 to move through the service sewer pipe 17 and determine a position of the radial bump 23, and operate the cutting tool 14 to cut an opening in a liner 18 of the service sewer pipe aligned with the annular spacer 25 so that a portion of the liner of the service sewer pipe adjacent the opening of the branch sewer pipe 16 is removed.

In the illustrated embodiment, the underground pipe repair device 15 includes a ring-shaped release tab 28 coupled to the second ring-shaped liner 22 and configured to prevent the liner 18 for the service sewer pipe 17 from bonding to adjacent portions of the second ring-shaped liner. The ring-shaped release tab 28 may be coupled to the second ring-shaped liner 22 via an adhesive layer (not shown) interposed between the ring-shaped release tab and the second ring-shaped liner. In other embodiments, the ring-shaped release tab 28 may be coupled to the second ring-shaped liner 22 via mechanical interface, such as buttons, rivets, for example.

During repair of the joint, the liner 18 for the service sewer pipe 17 is installed and cured after the installation and curing of the first T-shaped joint liner 19. The ring-shaped release tab 28 provides a barrier between adjacent portions 24 of the liner 18 for the service sewer pipe 17 and the first T-shaped joint liner 19. In typical approaches, the curing of the liner 18 for the service sewer pipe 17 may damage the adjacent portions of the first T-shaped joint liner 19, but in the disclosed approach, the ring-shaped release tab 28 provides protection from the second curing process. In fact, once the robot device 11 performs the cutting operation, the portion of the liner 18 of the service sewer pipe 17 adjacent the opening of the branch sewer pipe 16 is released.

In some embodiments (FIG. 5), the annular spacer 25 defines a plurality of radial gaps. During installation of the underground pipe repair device 15 at the joint, the annular spacer 25 is configured to flex to fit the opening in the branch sewer pipe 16. For example, the annular spacer 25 may be ellipse-shaped, or circle-shaped. The annular spacer 25 can be filled with a sealant to act as a gasket, further enhancing a seal between the service pipe liner and the first T-shaped joint liner 19.

The radial step 26 of the annular spacer 25 defines a pair of radial portions 27a-27b. Each radial portion 27a-27b of the annular spacer 25 has a different readily identifiable color (e.g. a bright primary color). Also, the annular spacer 25 may comprise a plastic material, and/or a frangible material (i.e. permitting the cutting tool 14 to readily remove portions of the annular spacer). Advantageously, the user operating the robot device 11 may precisely control the cutting step via the color indicators. This is in contrast to typical approaches where the user could inadvertently puncture the replacement liner.

Moreover, the stepped shape of the annular spacer enables the robot device 11 to be equipped with a lateral cutting tool, i.e. the cutting blade is parallel to the service sewer pipe 17. This horizontal cutting blade also prevents damage to the replacement liner since a vertical blade is not used.

In the illustrated embodiment, the joint is between the service sewer pipe 17 and the branch sewer pipe 16. In other embodiments, the underground pipe repair system 10 can be used on other underground pipe systems (e.g. storm water, drainage) where trenchless repair is desirable.

Figure 4:
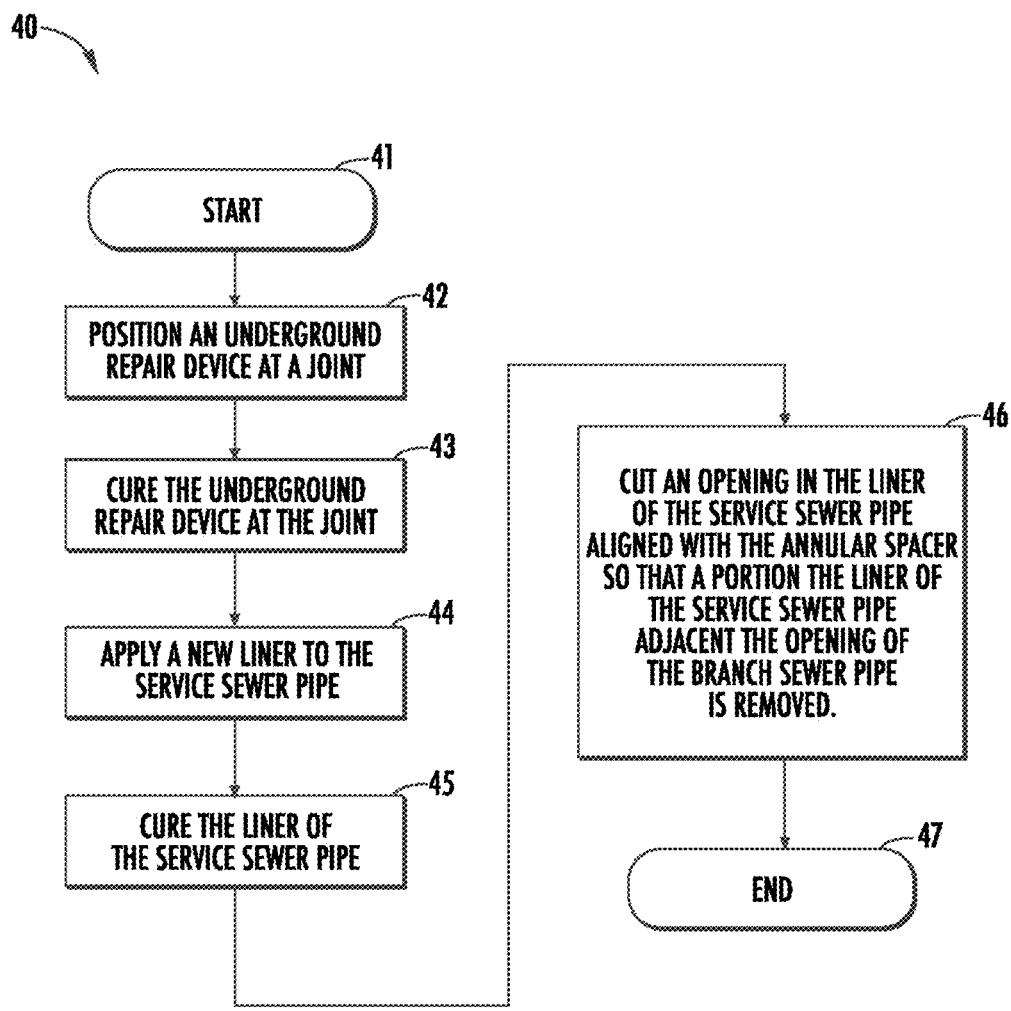
FIG. 4 is a flowchart illustrating a method for operating the underground pipe repair system of FIG. 1.

Referring now additionally to FIG. 4 and to a flowchart 40 therein, another aspect is directed to a method for operating an underground pipe repair system 10 for repairing a joint between a service sewer pipe 17 and a branch sewer pipe 16. The method comprises positioning an underground pipe repair device 15 at the joint. (Blocks 41-42). The underground pipe repair device 15 comprises a first T-shaped joint liner 19 having a base portion 21 extending laterally in the service sewer pipe 17, and an arm portion 20 extending vertically into the branch sewer pipe 16, and a second ring-shaped liner 22 under the first T-shaped joint liner and aligned with an opening in the branch sewer pipe.

The underground pipe repair device 15 comprises an annular spacer 25 aligned with the opening in the branch sewer pipe 16 and being between the first T-shaped joint liner 19 and the second ring-shaped liner 22. The annular spacer 25 includes at least one radial step 26, and the second ring-shaped liner 22 is coupled to the base portion 21 of the first T-shaped joint liner 19 to retain the annular spacer. The annular spacer 25 extends vertically into the service sewer pipe 17 so that the second ring-shaped liner 22 has a radial bump 23 about the opening of the branch sewer pipe 16.

The method also includes curing the underground pipe repair device 15 to the joint (Block 43), applying and curing a liner 18 for the service sewer pipe 17 (Blocks 44-45), and cutting an opening in the liner of the service sewer pipe aligned with the annular spacer 25 so that a portion the liner of the service sewer pipe adjacent the opening of the branch sewer pipe 16 is removed. (Blocks 46-47).

Figure 2:
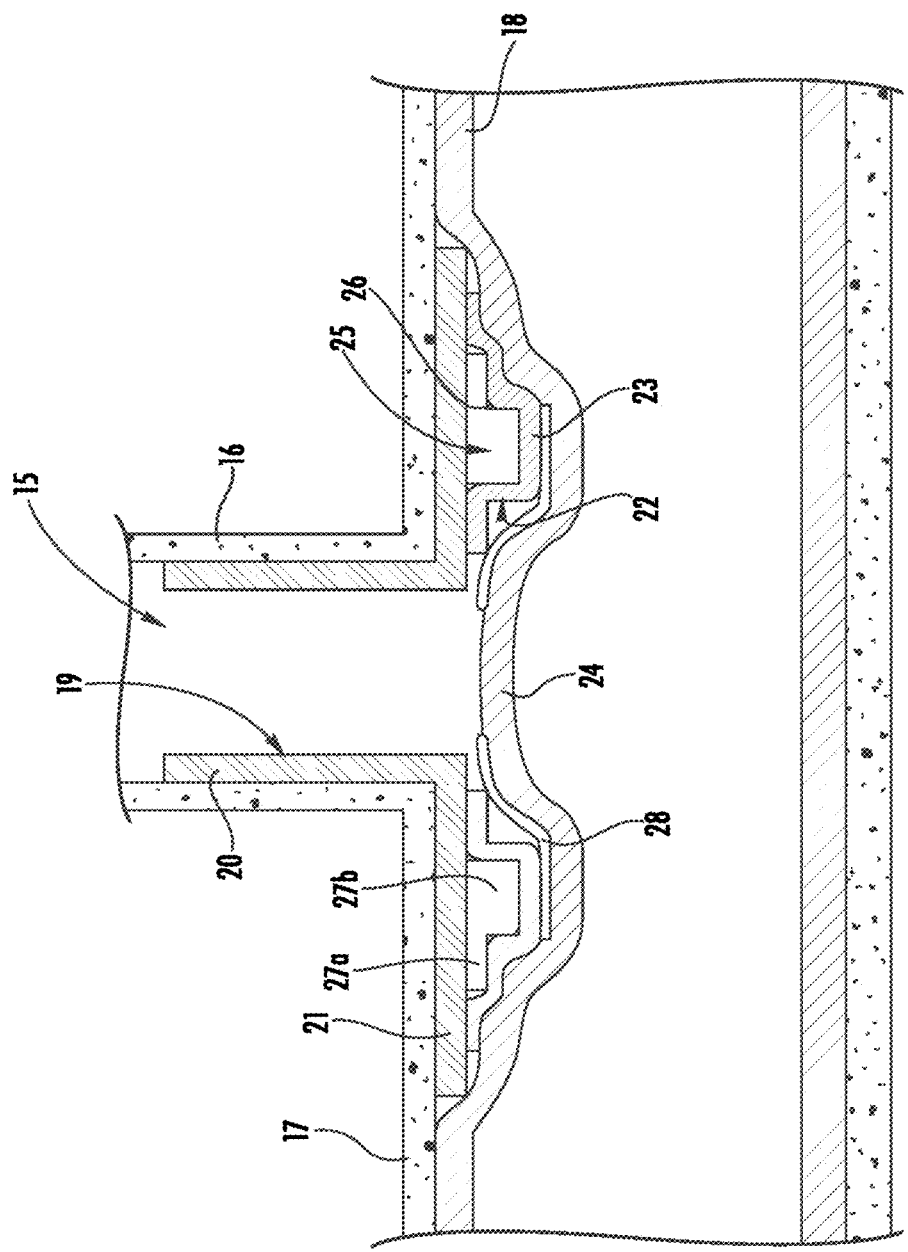
FIG. 2 is a schematic diagram of an underground pipe repair device, according to a first example embodiment.

In some embodiments (FIG. 2), the underground pipe repair device 15 may comprise a ring-shaped release tab 28 coupled to the second ring-shaped liner 22, and the method may further comprise preventing the liner 18 for the service sewer pipe 17 from bonding to adjacent portions of the second ring-shaped liner. In other embodiments (FIG. 3), the underground pipe repair device 15 may include a coating layer 28' on the second ring-shaped liner 22, and the method may further comprise preventing the liner 18 for the service sewer pipe 17 from bonding to adjacent portions of the second ring-shaped liner.

Also, the annular spacer 25 may define a plurality of radial gaps, and the method may further comprise flexing a shape of the annular spacer to fit the opening in the branch sewer pipe 16. The at least one radial step 26 of the annular spacer 25 may define at least one pair of radial portions 27a-27b, and each radial portion of the annular spacer may have a different color. The method may also comprise controlling the cutting based upon visibility of the different color of each radial portion 27a-27b.

Figure 3:
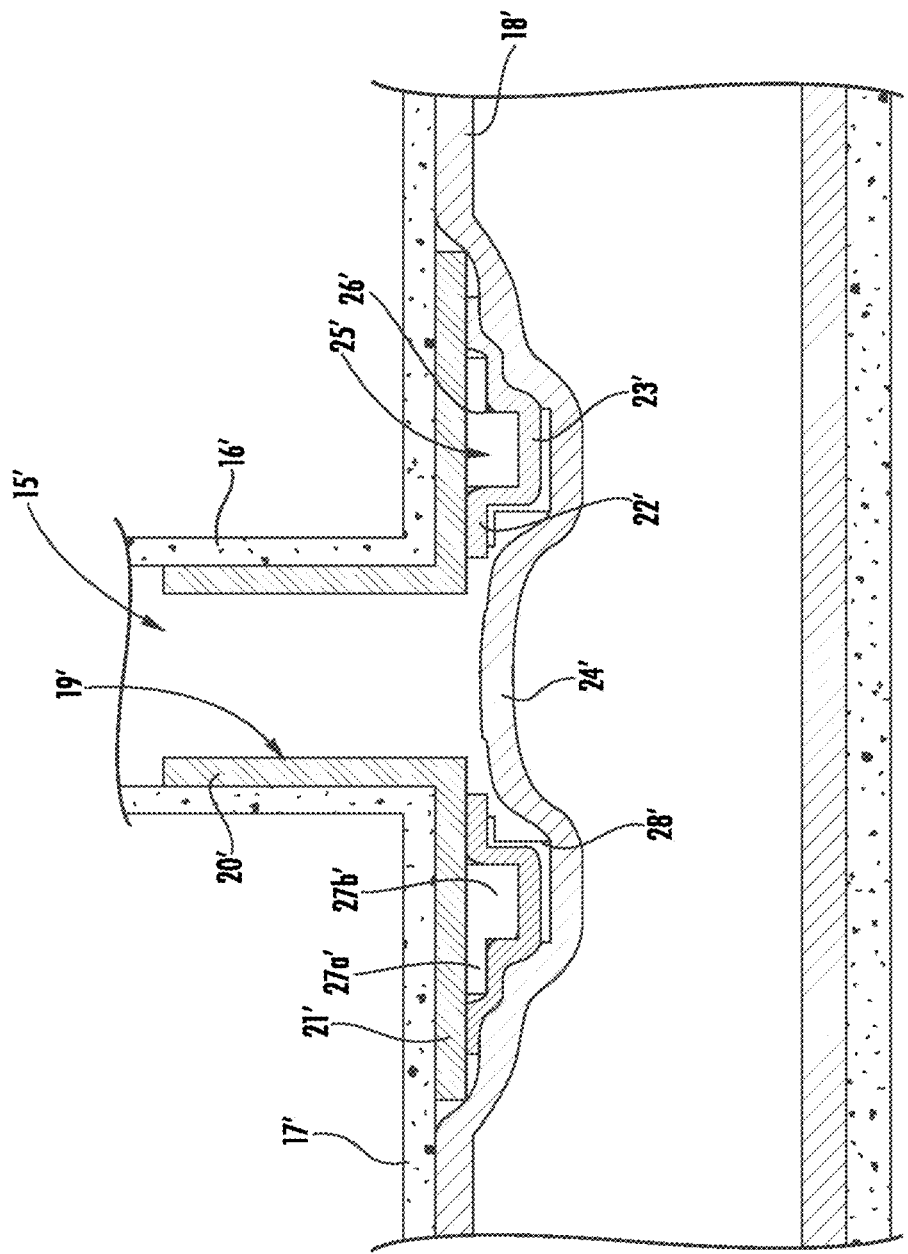
FIG. 3 is a schematic diagram of an underground pipe repair device, according to a second example embodiment.

Referring now additionally to FIG. 3, another embodiment of the underground pipe repair device 15' is now described. In this embodiment of the underground pipe repair device 15', those elements already discussed above with respect to FIGS. 1-2 are given prime notation and most require no further discussion herein. This embodiment differs from the previous embodiment in that this underground pipe repair device 15' has a coating layer 28' on the second ring-shaped liner 22' and configured to prevent the liner 18' for the service sewer pipe 17' from bonding to adjacent portions of the second ring-shaped liner. The coating layer 28' may comprise a material that has chemically resistant characteristics to the curing process of the liner 18' for the service sewer pipe 17'. The material may comprise polytetrafluoroethylene (PTFE), for example.

Figure 5:
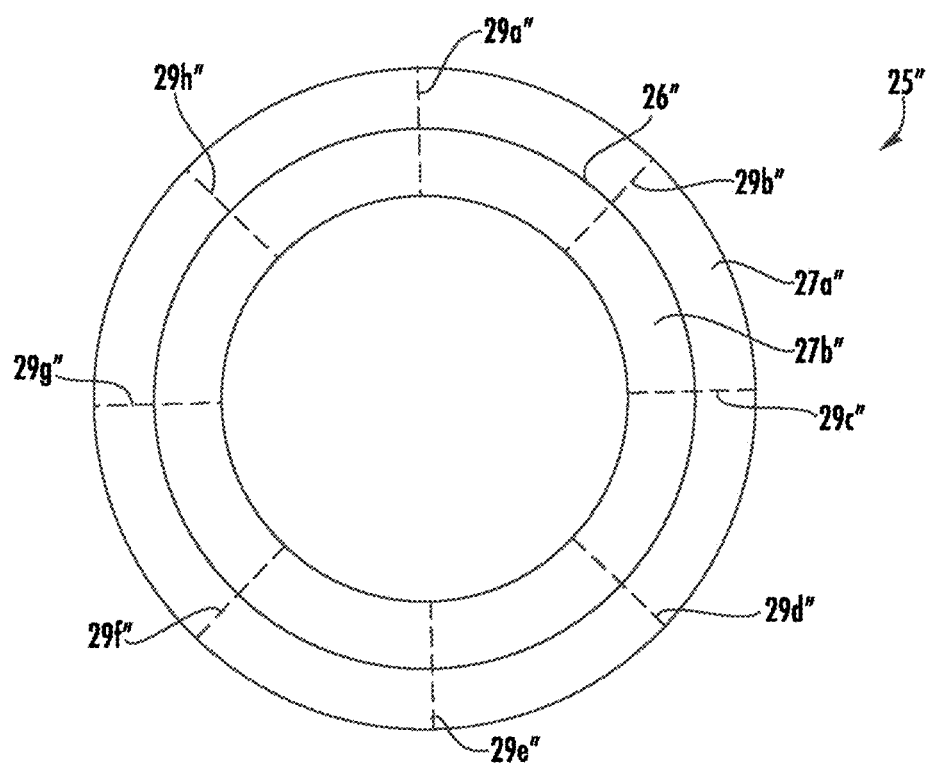
FIG. 5 is a schematic top plan view of another embodiment of the annular spacer from the underground pipe repair device, according to an example embodiment.

Referring now additionally to FIG. 5, another embodiment of the annular spacer 25" is now described. In this embodiment of the annular spacer 25", those elements already discussed above with respect to FIGS. 1-2 are given double prime notation and most require no further discussion herein. This embodiment differs from the previous embodiment in that this annular spacer 25" illustratively includes a plurality of radial gaps 29a"-29h". The plurality of radial gaps 29a"-29h" permits the annular spacer 25" to flex and fit a branch pipe opening. In the illustrated embodiment, the plurality of radial gaps 29a"-29h" is spaced at approximately 45 degrees, but other arrangements are possible, for example, spacing being >10 degrees, and <90 degrees.

Figure 6:
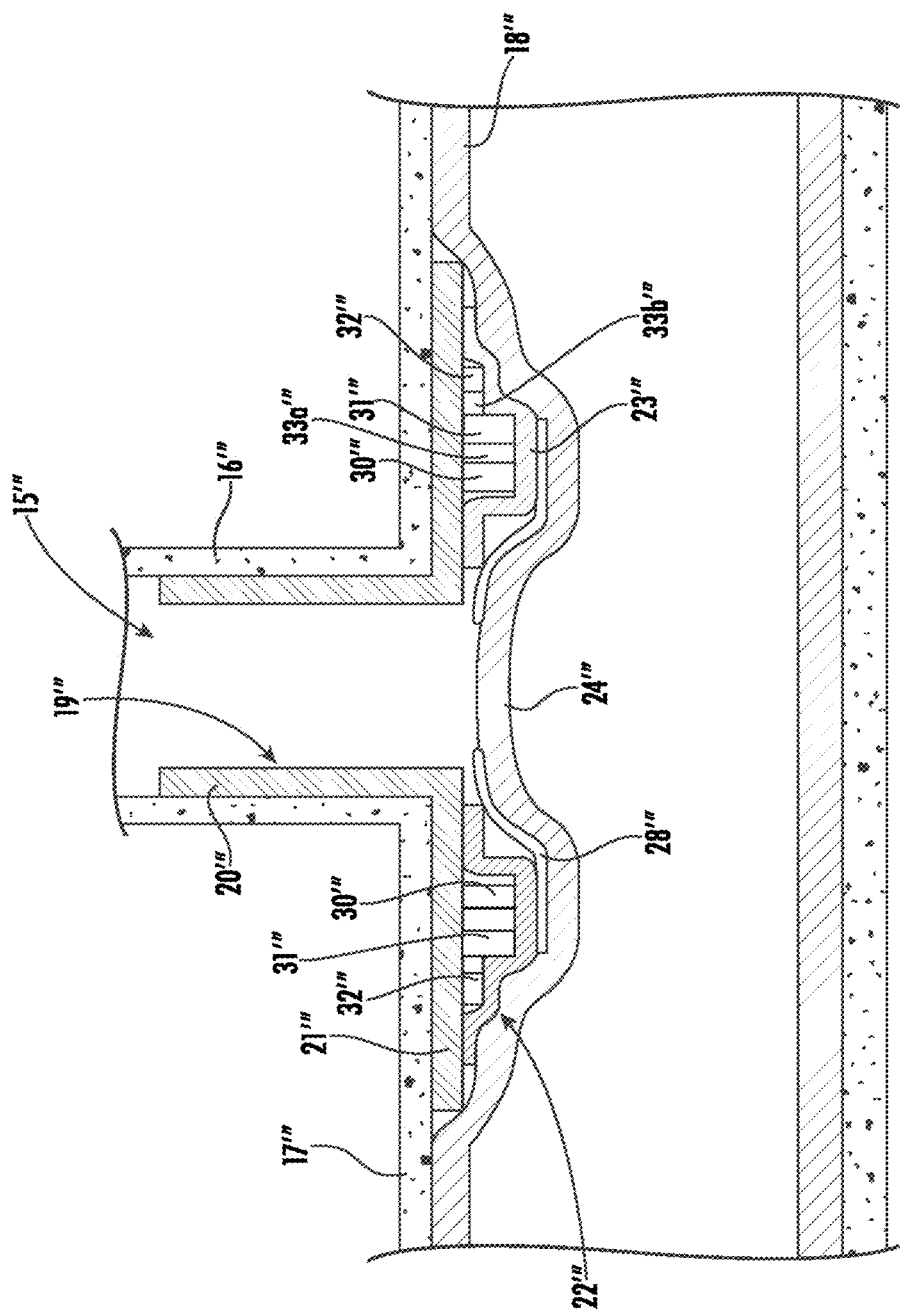
FIG. 6 is a schematic diagram of an underground pipe repair device, according to a third example embodiment.

Referring now additionally to FIG. 6, another embodiment of the underground pipe repair device 15''' is now described. In this embodiment of the underground pipe repair device 15''', those elements already discussed above with respect to FIGS. 1-3 & 5 are given triple prime notation and most require no further discussion herein.

This embodiment differs from the previous embodiment in that this underground pipe repair device 15''' illustratively includes a first T-shaped joint liner 19" having a base portion 21''' extending laterally in the service pipe 17''', and an arm portion 20''' extending vertically into the branch pipe 16''', and a first annular spacer 30''' aligned with an opening in the branch pipe and being coupled to an underside of the first T-shaped joint liner. The underground pipe repair device illustratively includes a second annular spacer 31''' aligned with the opening in the branch pipe and being coupled to the underside of the first T-shaped joint liner 19'''. The first annular spacer 30''' is radially within the second annular spacer 31'''.

The underground pipe repair device 15''' illustratively includes a third annular spacer 32''' aligned with the opening in the branch pipe 16''' and being coupled to the underside of the first T-shaped joint liner 19'''. The second annular spacer 31''' is radially within the third annular spacer 32'''.

One or both of second annular spacer 31''' and the third annular spacer 32''' comprise a swellable seal. In particular, the swellable seal is a seal that swells in the presence of moisture (e.g. a water swellable material). The swellable seal may comprise one or more of a swellable seal, a bonding agent, a hydrophilic substance, and/or sealant. Once the underground pipe repair device 15''' is installed at the branch pipe 16''', as ground water attempts to penetrate laterally from the service pipe liner 18'', the swellable annular spacers will expand and create a radial seal between the base portion 21''' of the first T-shaped joint liner 19'' and the second ring-shaped liner 22'''. The service pipe liner 18''

One or both of second annular spacer 31''' and the third annular spacer 32''' comprise a color coded frangible indicator material (e.g. color coded polymer plastic) for indicating a location of a cutting incision. Also, the first, second, and third annular spacers 30'''-32''' define first and second annular gaps 33a'''-33b''' therebetween.

In the illustrated embodiment, the underground pipe repair device 15''' illustratively includes a second ring-shaped liner 22''' under the first T-shaped joint liner 19''' and aligned with the opening in the branch pipe 16'''. The second ring-shaped liner 22''' is coupled to the base portion 21''' of the first T-shaped joint liner 19''' to retain the first annular spacer 30''', the second annular spacer 31''', and the third annular spacer 32'''. The underground pipe repair device illustratively includes a ring-shaped release tab 28''' coupled to the second ring-shaped liner 22''' and configured to prevent a liner 18''' for the service pipe 17''' from bonding to adjacent portions of the second ring-shaped liner. In other embodiments (similar to the embodiment of FIG. 3), the underground pipe repair device 15''' may further comprise a coating layer on the second ring-shaped liner 22''' and configured to prevent the liner 18''' for the service pipe 17''' from bonding to adjacent portions of the second ring-shaped liner.

In some embodiments, the second ring-shaped liner 22''' and the ring-shaped release tab 28''' (or coating layer) are omitted. In these embodiments, the swellable annular spacers will expand and create the radial seal between the base portion 21''' of the first T-shaped joint liner 19'' and the liner 18''' for the service pipe 17'''.

Also, the first annular spacer 30''' illustratively extends vertically into the service pipe 17''' so that the liner 18''' for the service pipe has a radial bump 23''' about the opening of the branch pipe 16'''. The first annular spacer 30''' and the second annular spacer 31''' each illustratively has a greater height than the third annular spacer 32'''. The first and second annular spacers 30''', 31''' each may comprise a plastic material. Each of the first annular spacer 30''' and second annular spacer 31''' may have a different color. The first annular spacer 30''' may comprise a frangible material.

In other embodiments, the underground pipe repair device 15''' may include additional annular spacers above and beyond the first, second, and third annular spacers 30'''-32'''. The additional annular spacers may comprise either swellable material for providing more annular seals or frangible material for additional cutting indicators.

Figure 7:
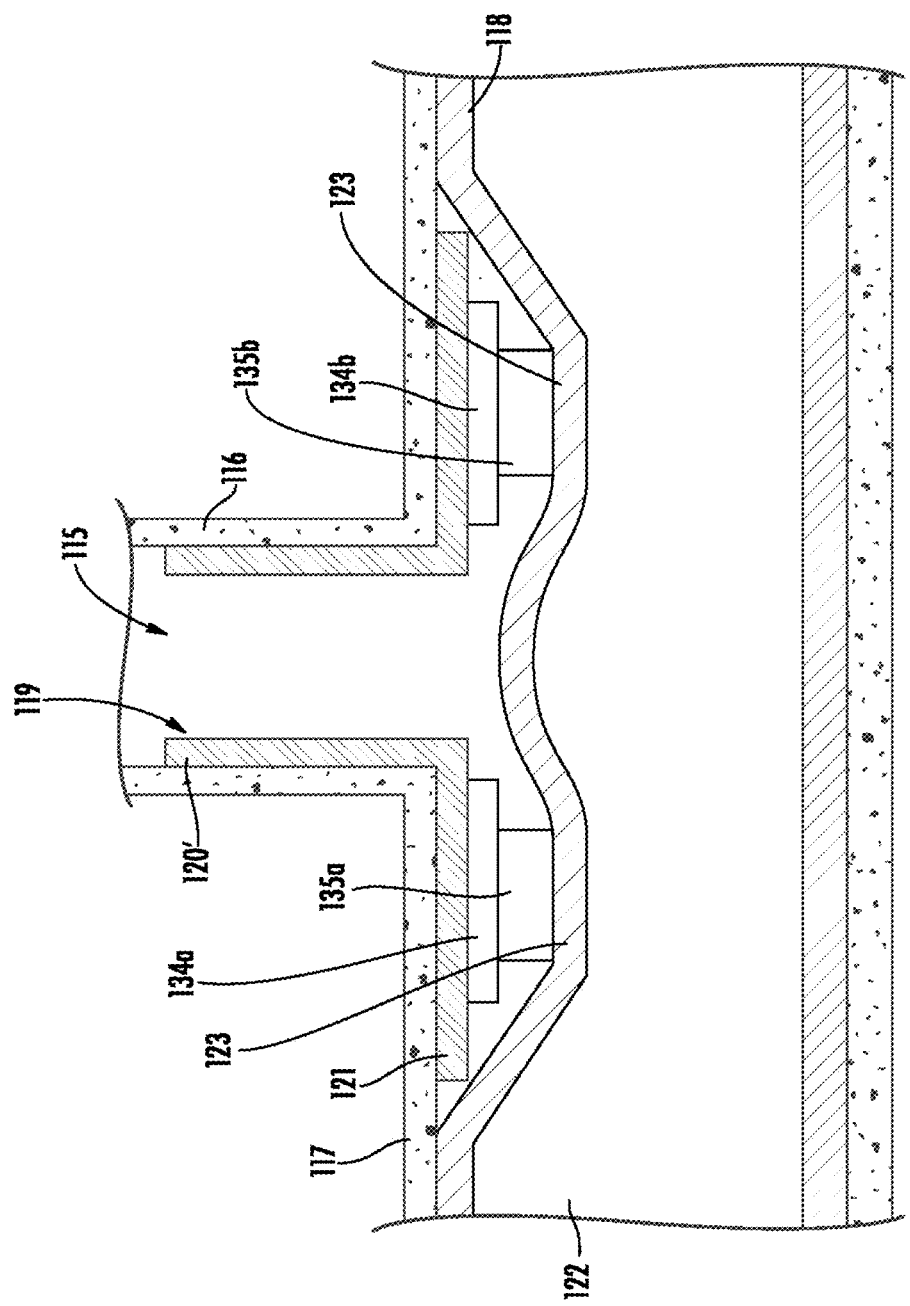
FIG. 7 is a schematic diagram of an underground pipe repair device, according to a fourth example embodiment.
Figure 8:
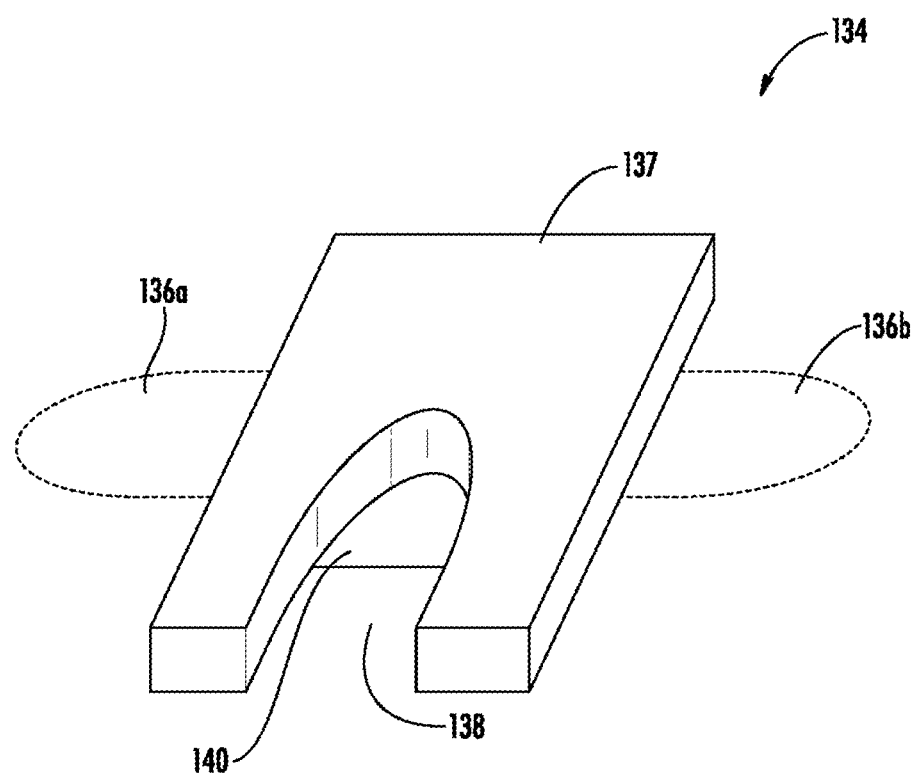
FIG. 8 is a schematic perspective view of a retention device from the underground pipe repair device, according to an example embodiment.
Figure 12:
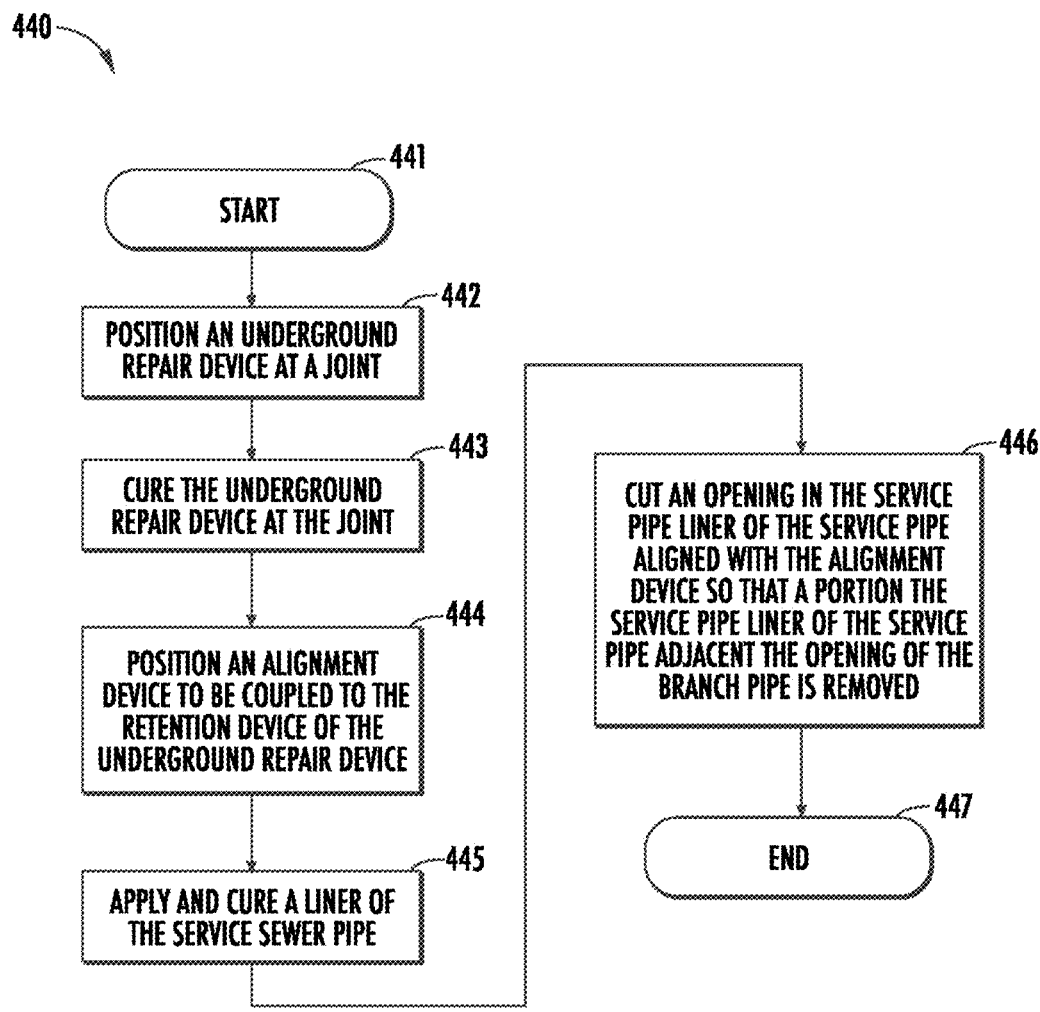
FIG. 12 is a flowchart illustrating a method for operating the underground pipe repair system of FIG. 1.

Referring now additionally to FIGS. 7-8 and 12, another embodiment of the underground pipe repair device 115 is now described. Also, with reference to a flowchart 440, a method for operating the underground pipe repair device 115 is also now described. (Block 441). In this embodiment of the underground pipe repair device 115, those elements already discussed above with respect to FIGS. 1-3 & 6 are incremented by 100 and most require no further discussion herein. This embodiment differs from the previous embodiment in that this underground pipe repair device 115 illustratively includes a T-shaped joint liner 119 having a base portion 121 extending laterally in the service pipe 117, and an arm portion 120 extending vertically into the branch pipe 116. The underground pipe repair device 115 illustratively includes a plurality of retention devices 134a-134b embedded in the base portion adjacent an opening in the branch pipe 116.

The underground pipe repair device 115 illustratively includes an alignment device 135a-135b to be coupled to the plurality of retention device 134a-134b, and a service pipe liner 118 extending in the service pipe 117 and under the T-shaped joint liner 119 and the alignment device. The alignment device 135a-135b extends vertically into the service pipe 117 so that the service pipe liner 118 has a radial bump 123 about the opening in the branch pipe 116.

As perhaps best seen in FIG. 8, each retention device 134a-134b illustratively includes an elongate body 137, and a plurality of tabs 136a-136b extending laterally from the elongate body. For example, in some embodiments, the plurality of tabs 136a-136b may be woven into the fabric of the base portion 121. The elongate body 137 defines a recess 138 therein, and illustratively includes a shelf portion 140 extending within the recess. The alignment device 135-135b may be at least partially received by the recess 138. The alignment device 135a-135b may comprise the annular spacers 25, 25' of the embodiments of FIGS. 2-3 or the first, second, and third annular spacers 30'''-32''' of the embodiment of FIG. 6.

As will be appreciated, a method for operating an underground pipe repair system for repairing a joint between the service pipe 117 and a branch pipe 116 is now described and uses the underground pipe repair device 115. The method illustratively includes positioning the underground pipe repair device 115 at the joint. (Block 442). The method may include curing the underground pipe repair device 115 to the joint. (Block 443). Once the underground pipe repair device 115 is cured to the joint, the method includes positioning an alignment device 135a-135b to be coupled to the plurality of retention devices 134a-134b. (Block 444).

In some embodiments, such as in FIG. 8, the alignment device 135a-135b would include a protruding portion (e.g. a hook for hanging on the shelf portion 140) for being inserted into the recess 138 of each retention device 134a-134b. In other embodiments, each retention device 134a-134b may comprise a hook and loop interface (i.e. the opposing interface being on the alignment device 135a-135b). In other embodiments, each retention device 134a-134b may comprise a grommet, eyelet, or magnetic device embedded in the base portion 121. Indeed, any coupling/physical interface device can be used so long as it can support the weight of the alignment device 135a-135b.

The method also illustratively includes applying and curing the service pipe liner 118 for the service pipe 117 (Block 445), and cutting an opening in the service pipe liner of the service pipe aligned with the alignment device 135a-135b so that a portion the service pipe liner of the service pipe adjacent the opening of the branch pipe 116 is removed. (Blocks 446-447).

Advantageously, in embodiments where the alignment device 135a-135b comprises the first, second, and third annular spacers 30'''-32''' of the embodiment of FIG. 6, the T-shaped joint liner 119 is completely cured to the joint before attachment of the alignment device. This can helpful in embodiments where one or both of second annular spacer 31''' and the third annular spacer 32''' comprise a swellable seal. In past approaches where the alignment device 135a-135b is integrated with the T-shaped joint liner 119, the swellable seals would prematurely absorb ambient water and expand. This would be before application of the service pipe liner 118, and since these swellable seals are intended to abut and swell up against this same service piper liner, this could lead to unwanted water intrusion after the relining. Positively, the alignment device 135a-135b is applied right before the application of the service pipe liner 118, assuring that the swellable seals expand against the service pipe liner.

Figure 9:
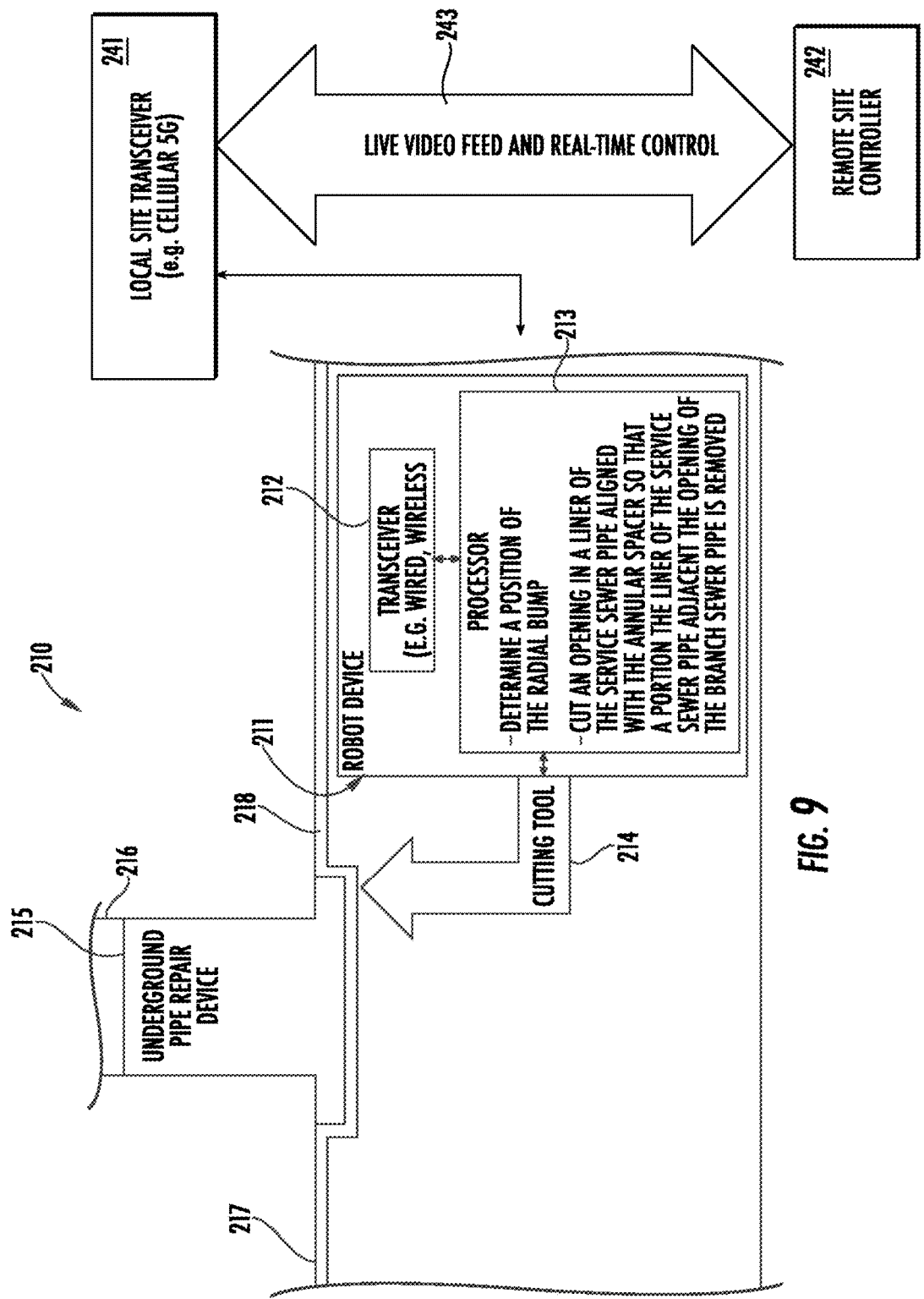
FIG. 9 is a schematic diagram of an underground pipe repair system, according to another example embodiment.

Referring now additionally to FIG. 9, another embodiment of the underground pipe repair system 210 is now described. In this embodiment of the underground pipe repair system 210, those elements already discussed above with respect to FIGS. 1-3 & 6, 7 are incremented by 100 and most require no further discussion herein. This embodiment differs from the previous embodiment in that this underground pipe repair system 210 illustratively includes a local site transceiver 241 in communication with the robot device 211. As will be appreciated, the local site transceiver 241 uses a wired or wireless connection to the transceiver 212 of the robot device 211. The local site transceiver 241 may comprise a large bandwidth (e.g. >50 Mbps), low latency (<1 ms) wireless transceiver, such as, for example, a 5th-Generation Wireless Systems (5G) technology that satisfies ITU IMT-2020 requirements and 3GPP Release 15, which is incorporated by reference in its entirety.

The underground pipe repair system 210 also illustratively includes a remote site controller 242 (e.g. spaced apart by several or more miles) in communication with the local site transceiver 241 over a real-time connection 243. Helpfully, a user at the remote site controller 242 can operate the robot device 211 remotely, or perhaps across long distances. The real-time connection 243 would provide a live video feed to the user at the remote site controller 242, and the user could manipulate the robot device 211 at one or more sites, leveraging the connection to reduce personnel costs.

In some embodiments (not shown), the local site transceiver 241 illustratively includes a location module (e.g. global positioning system (GPS) module) configured to generate location data for the underground pipe repair system 210, and a module configured to provide a relative position (e.g. number of meters down pipe and a directional element) of the robot device 211. The local site transceiver 241 may also include a wireless local area network (WLAN) base station (not shown) (e.g. IEEE 802.11x, Bluetooth, WiMAX, Zigbee IEEE 802.15.4). The WLAN base station is configured to permit regulatory officials a wireless interconnect with the underground pipe repair system 210. For example, an inspector may login the underground pipe repair system 210 and determine whether work is occurring in the appropriate permitted location.

Figure 10:
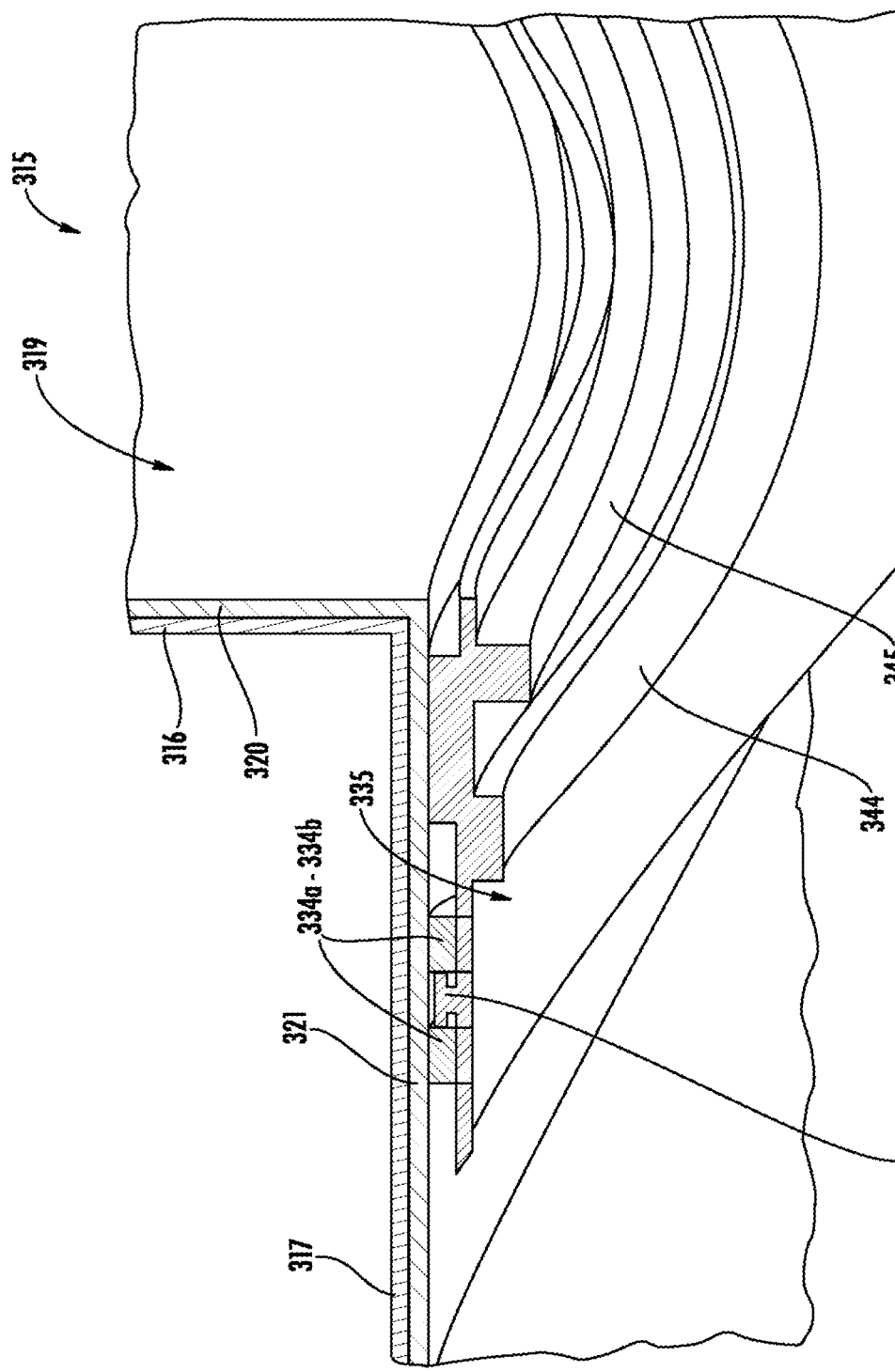
FIG. 10 is a schematic diagram of a portion of an underground pipe repair device, according to yet another example embodiment.
Figure 11:
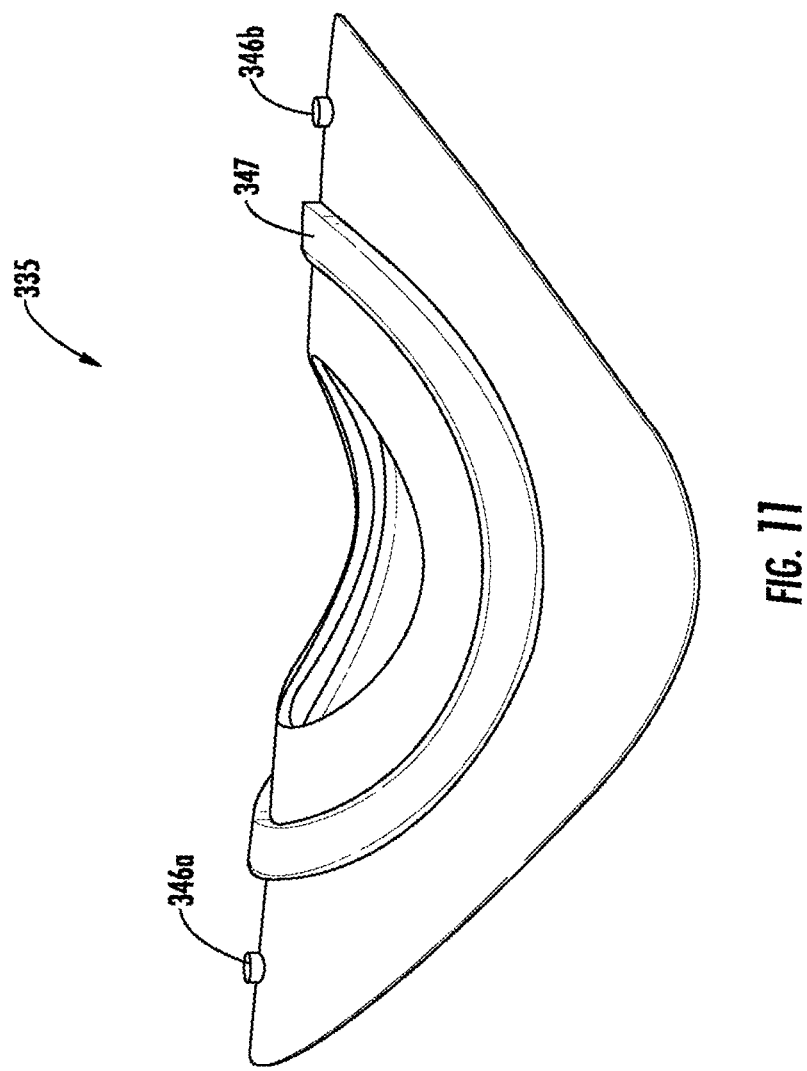
FIG. 11 is a schematic perspective view of the alignment device from the underground pipe repair device of FIG. 10.

Referring now additionally to FIGS. 10-11, another embodiment of the underground pipe repair device 315 is now described. In this embodiment of the underground pipe repair device 315, those elements already discussed above with respect to FIGS. 7-8 are incremented by 200 and most require no further discussion herein. This embodiment differs from the previous embodiment in that this underground pipe repair device 315 illustratively includes the retention device comprising a tongue and groove interface.

The underground pipe repair device 315 illustratively includes first and second annular rings 334a-334b defining a groove therebetween. The underground pipe repair device 315 illustratively includes an alignment device 335 to be coupled to the first and second annular rings 334a-334b.

The alignment device 335 illustratively includes a tongue portion 346 configured to interface (i.e. to fit into) with the groove. Here, the tongue portion 346 comprises a T-shaped tab structure, but other forms and shapes can be used. Also, the first and second annular rings 334a-334b may include radially inward protrusions to press and retain the tongue portion 346. That is, in these embodiments, the tongue portion 346 may snap fit into the groove. The alignment device 335 illustratively includes first and second annular spacers 344-345 of different height on an underside thereof for the robot device to find during the liner (not shown) cutting process. The alignment device 335 illustratively includes a third annular spacer 347 on the upper side thereof and configured to abut the base portion 321 of the T-shaped joint liner 319.

Figure 13:
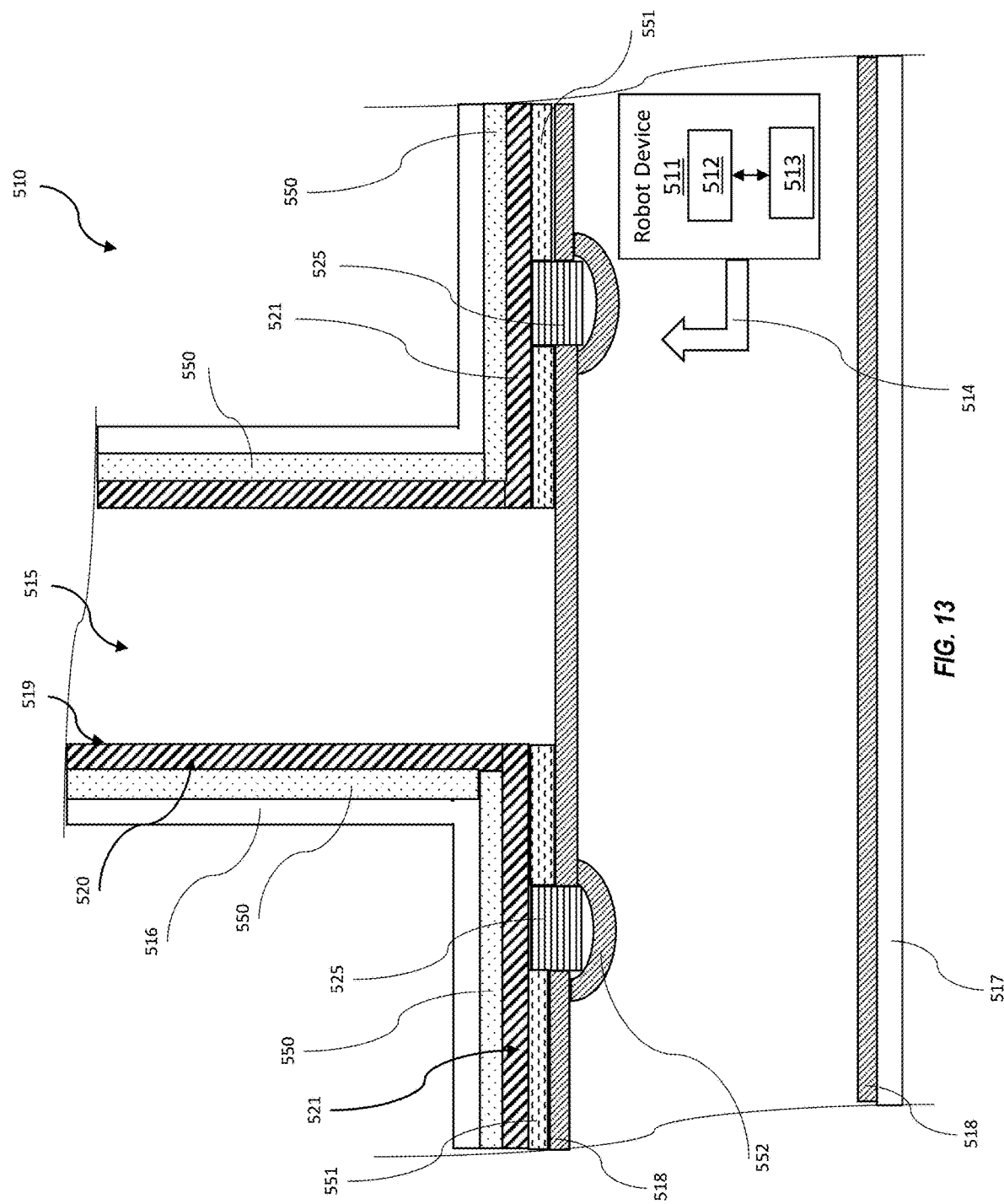
FIG. 13 is a schematic diagram of an underground pipe repair device, according to another example embodiment.

Referring now additionally to FIG. 13, another embodiment of the underground pipe repair system 510 is now described. In this embodiment of the underground pipe repair system 510, those elements already discussed above with respect to FIGS. 7-8 are incremented by 400 and most require no further discussion herein. The underground pipe repair system 510 is for repairing a joint between a service pipe 517 and a branch pipe 516. The underground pipe repair system includes an underground pipe repair device 515, and a robot device 511. The robot device 511 illustratively includes a transceiver 512, a cutting tool 514, and a processor 513 coupled to the transceiver and the cutting tool. The processor 513 is configured to cause the robot device 511 to move through the service pipe 517 and determine a position of the radial bump 522, and operate the cutting tool 514 to cut an opening in the service liner 518 of the service pipe aligned with the annular body 525 so that a portion the liner of the service pipe adjacent the opening of the branch pipe 516 is removed.

This embodiment differs from the previous embodiments in that this underground pipe repair device 515 illustratively includes a T-shaped joint liner 519 comprising a base portion 521 extending laterally in the service pipe 517, and an arm portion 520 extending vertically into the branch pipe 516. The base portion 521 illustratively includes a first base surface facing the service pipe, and a second base surface opposite the first base surface. The T-shaped joint liner 519 includes a swellable coating covering 550 the first base surface. The underground pipe repair device 515 illustratively comprises an annular body 525 aligned with an opening for the branch pipe 516 and coupled to the second base surface of the T-shaped joint liner 519.

The T-shaped joint liner 519 illustratively includes a flexible curable layer 551 abutting the second base surface. In other words, when the service liner 518 is cured, there is a strong mechanical bond to the T-shaped joint liner 519 since the two piece cure and couple together.

The arm portion 520 comprises a first arm surface facing the branch pipe 516, and a second arm surface opposite the first arm surface. The swellable coating 550 also illustratively covers the first arm surface. In some embodiments, the swellable coating 550 may cover an entirety of the first base surface and an entirety of the first arm surface. Advantageously, the swellable coating 550 prevent intrusion into the relined joint.

The annular body 525 extends vertically into the service pipe to provide the radial bump 552 about the opening of the branch pipe 516. The annular body 525 illustratively includes a rectangle-shaped cross section, but may comprise other shapes, such as a circle or oval cross section.

The annular body 525 may comprise portions, each portion having a different color. The annular body 525 may comprise a plastic material. The annular body 525 comprises a frangible material.

Yet another is directed to a method for operating an underground pipe repair system 510 for repairing a joint between a service pipe 517 and a branch pipe 516. The method includes positioning an underground pipe repair device 515 at the joint. The underground pipe repair device 515 also includes a T-shaped joint liner 519 comprising a base portion 521 extending laterally in the service pipe 517, and an arm portion 520 extending vertically into the branch pipe 516. The base portion 521 comprises a first base surface facing the service pipe 517, and a second base surface opposite the first base surface. The T-shaped joint liner 519 includes a swellable coating 550 covering the first base surface. The underground pipe repair device 515 also includes an annular body 525 aligned with an opening for the branch pipe 516 and coupled to the second base surface of the T-shaped joint liner. The method also includes curing the underground pipe repair device 515 to the joint, applying and curing a service liner 518 for the service pipe, and cutting an opening in the liner of the service pipe aligned with the annular body 525 so that a portion the liner of the service pipe adjacent the opening of the branch pipe 516 is removed.

Figure 14:
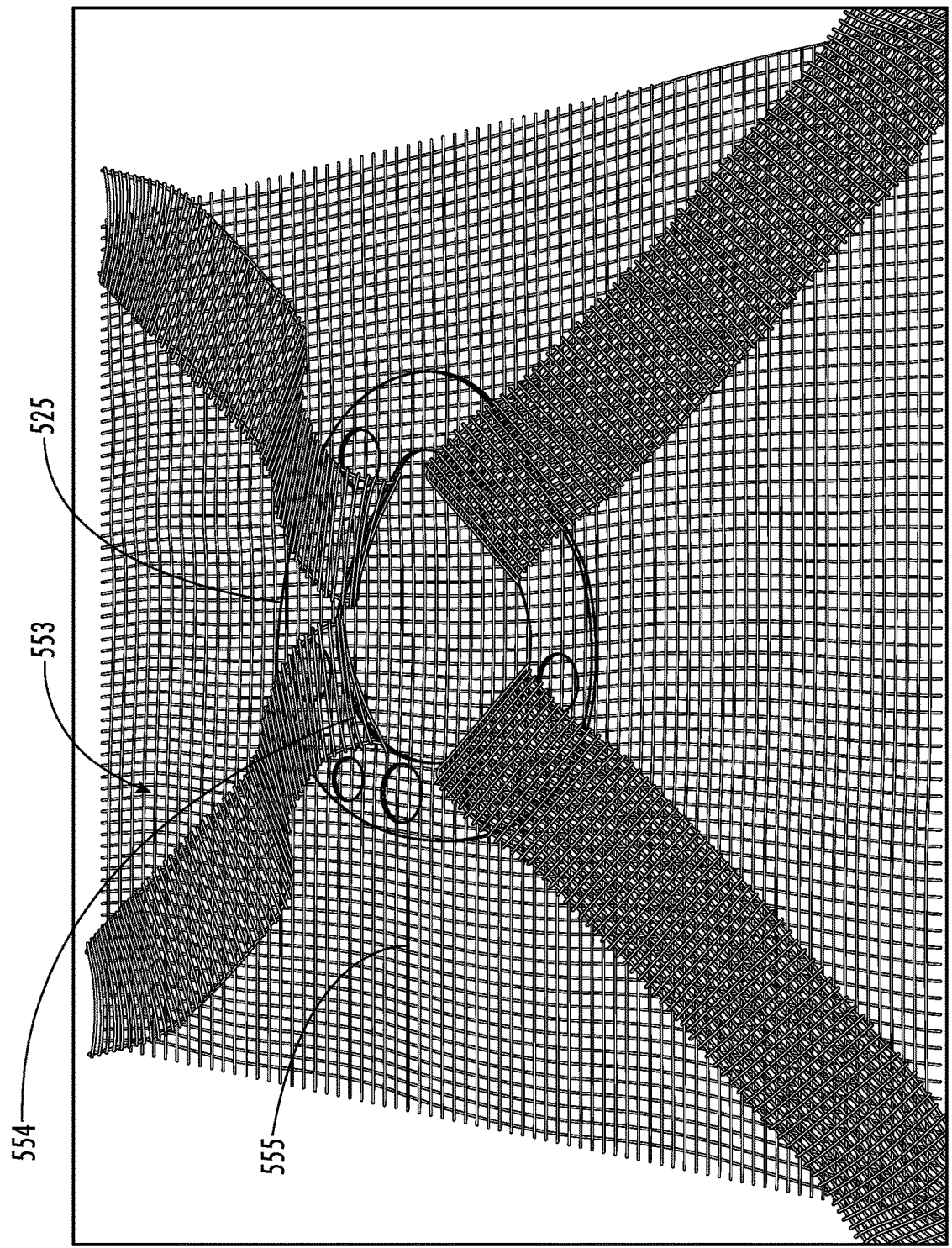
FIG. 14 is a schematic perspective view of an example embodiment of the annular body for the underground pipe repair device.

Referring now to FIG. 14, in some embodiments, the underground pipe repair device 515 comprises a scrim piece 553 coupled to the annular body 525. In particular, the scrim piece 553 comprises a medial portion 554 wrapped around the annular body 525, and an outer radial portion extending outward to define an anchoring portion 555 for coupling to the base portion 521. The scrim piece 553 effects a secure coupling of the annular body 525 to the second base surface, yet permits the service liner 518 to be cured onto the second base surface.

It should be appreciated that any feature from the prior embodiments of the underground pipe repair system 10, 210 or the underground pipe repair device 15, 15', 15''', 115, 315 may be incorporated in the underground pipe repair system 510.

Figure 15:
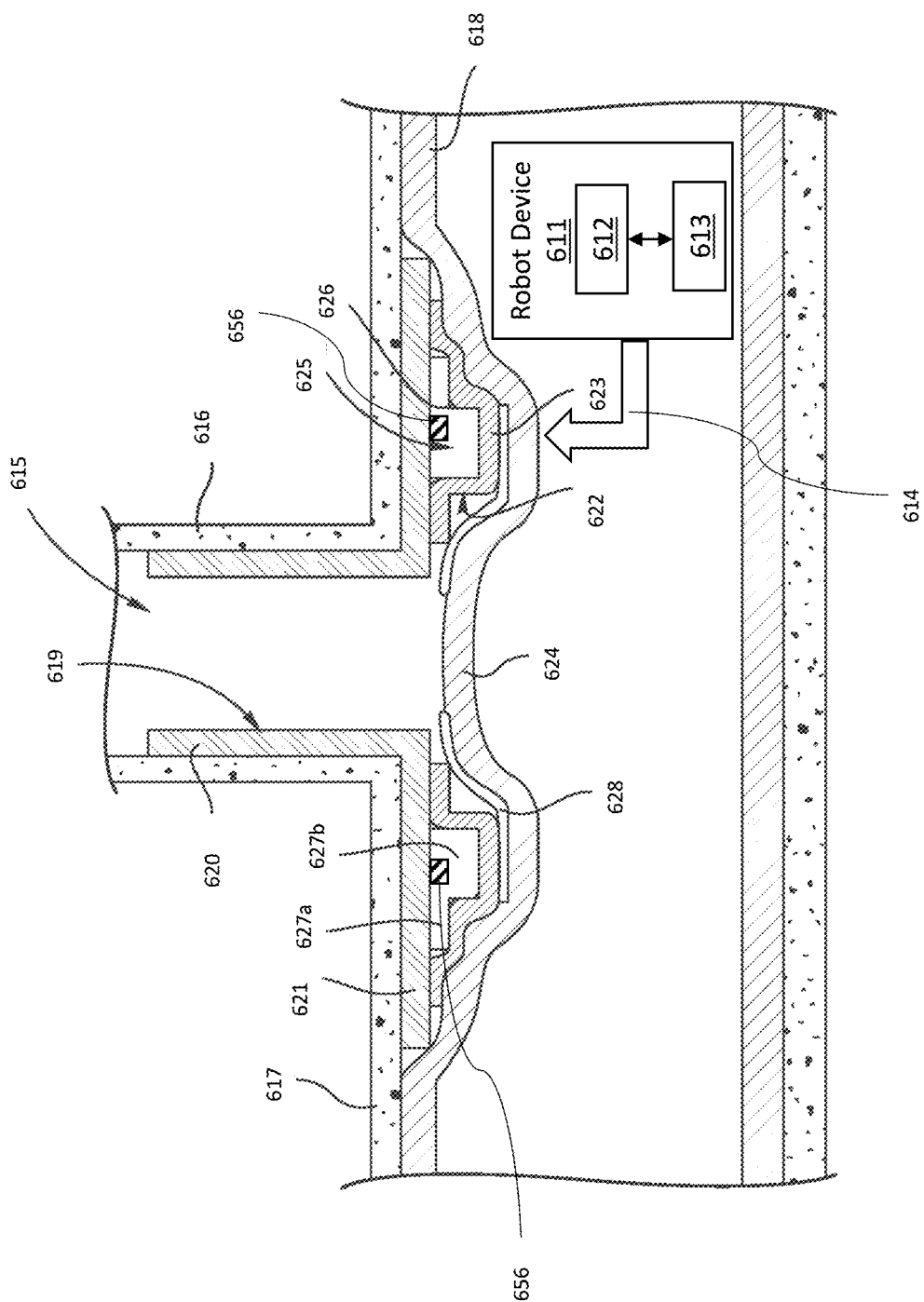
FIG. 15 is a schematic diagram of an underground pipe repair device, according to another example embodiment.
Figure 16:
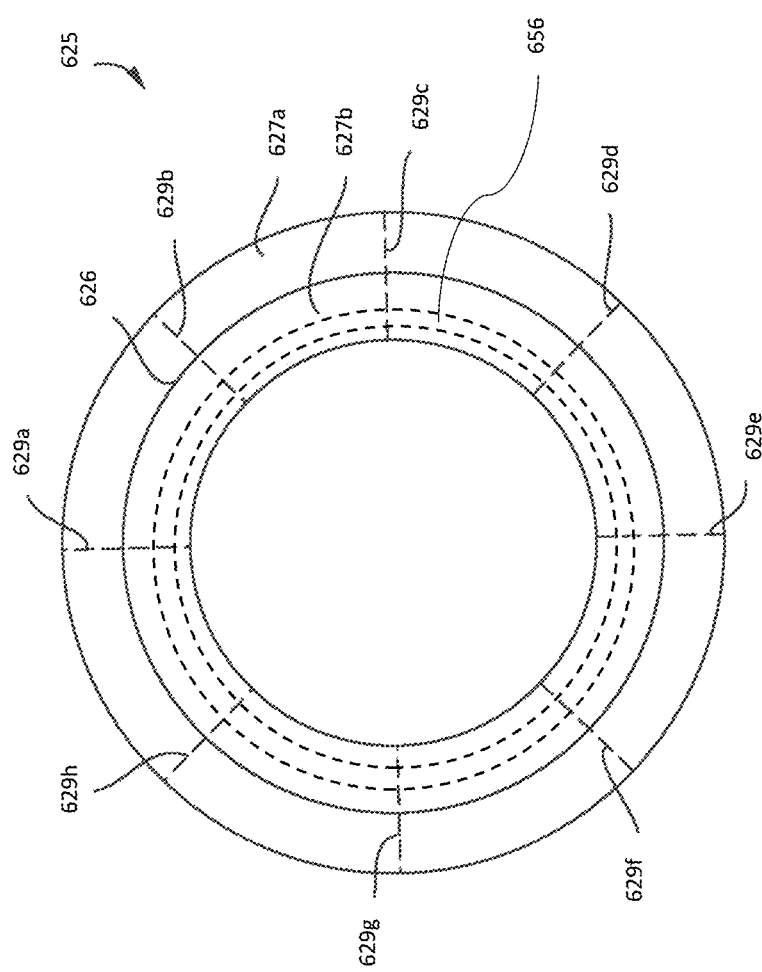
FIG. 16 is a schematic top plan view of the annular spacer from the underground pipe repair device of FIG. 15.

Referring now additionally to FIGS. 15-16, another embodiment of the underground pipe repair device 615 is now described. In this embodiment of the underground pipe repair device 615, those elements already discussed above with respect to FIGS. 2 & 5 are incremented by 600 and most require no further discussion herein. The underground pipe repair device 615 includes the annular body 625 having a magnetic material ring 656 therein. For example, the magnetic material ring 656 may comprise a ferromagnetic material, such as ferrite. In the illustrated embodiment, the magnetic material ring 656 is a continuous loop, but in other embodiments, the magnetic material ring 656 may comprise a plurality of magnetic pieces spaced apart in the annular body 625.

During cutting of the service liner 618, the robot device 611 is configured to detect the presence of the magnetic material ring 656 using an electromagnetic field generating device (e.g. an electromagnet) to apply an electromagnetic field to the magnetic material ring 656. In some embodiments, the annular body 625 may be flat and provide little or no visually appreciable radial bump, and the robot device 611 would rely only or primarily on the feedback from the electromagnetic field generating device to locate a cutting point. In some embodiments, the electromagnetic field generating device comprises an electromagnet, and the feedback comprises magnetic attraction.

In another embodiment, the annular body 625 comprises an RFID tag carried thereby. Here, the robot device 611 is configured to detect the RFID tag using an RF transmitter.

Figure 17:
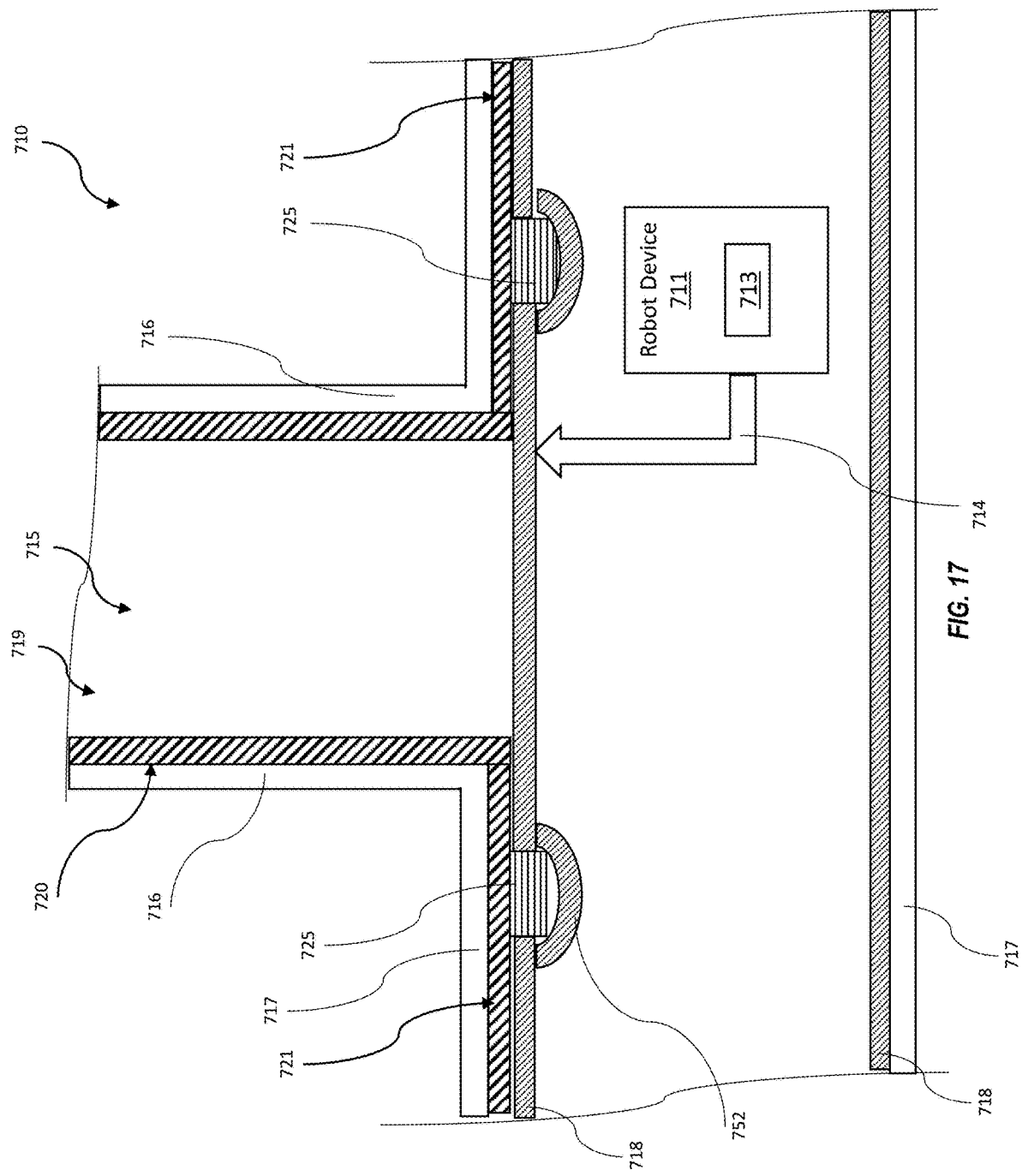
FIG. 17 is a schematic diagram of an underground pipe repair device, according to another example embodiment.

Referring now additionally to FIG. 17, another embodiment of the underground pipe repair system 710 is now described. In this embodiment of the underground pipe repair system 710, those elements already discussed above with respect to FIGS. 2 & 5 are incremented by 700 and most require no further discussion herein. The underground pipe repair system 710 is for repairing a joint between a service pipe 717 and a branch pipe 716. The underground pipe repair system 710 illustratively comprises an underground pipe repair device 715 comprising a T-shaped joint liner 719 comprising a base portion 721 extending laterally in the service pipe 717, and an arm portion 720 extending vertically into the branch pipe 716.

The base portion 721 illustratively comprises a first base surface facing the service pipe 717, and a second base surface opposite the first base surface (i.e. facing towards the interior of the service pipe 717). The underground pipe repair device 715 illustratively includes an annular body 725 aligned with an opening for the branch pipe 716 and coupled to the second base surface of the T-shaped joint liner 719. The annular body 725 includes a physical characteristic that can be detected.

The underground pipe repair system 710 illustratively includes a robot device 711 comprising a cutting tool 714, and a processor 713 coupled to the cutting tool. The processor 713 is configured to cause the robot device 711 to move through the service pipe 717 and determine a position of the annular body 725 based upon detecting the physical characteristic. The processor 713 is configured to operate the cutting tool 714 to cut an opening in a liner 718 of the service pipe 717 aligned with the annular body 725 so that a portion the liner of the service pipe adjacent the opening of the branch pipe 716 is removed.

In some embodiments, the physical characteristic may comprise a ferromagnetic characteristic, and the annular body 725 comprises a magnetic material. For example, the annular body 725 may comprise the magnetic material ring 656 of FIG. 16, or a plurality of spaced apart magnetic material pieces embedded therein.

In other embodiments, the physical characteristic may comprise an RFID tag (e.g. near field communications (NFC)) carried by the annular body 725. Here, the robot device 711 comprises an RF antenna to energize the passive RFID tag in the annular body 725. In yet other embodiments, the physical characteristic may comprise a known electrical potential. Here, the annular body 725 may be coupled to a reference voltage, and the known electrical potential may comprise the reference voltage (e.g. ground potential, 10 Volts DC). The robot device 711 comprises an electrical probe to run against an interior of the liner 718 of the service pipe 717 to detect the presence of the reference voltage.

Also, in some embodiments, the T-shaped joint liner 719 may comprise a flexible curable layer abutting the first base surface and the second base surface of the base portion 721, and the first arm surface of the arm portion 720. For example, this may be as depicted in the embodiment of FIG. 13.

Another aspect is directed to a method for operating an underground pipe repair system 710 for repairing a joint between a service pipe 717 and a branch pipe 716. The method includes positioning an underground pipe repair device 715 at the joint. The underground pipe repair device 715 includes a T-shaped joint liner 719 comprising a base portion 721 extending laterally in the service pipe 717, and an arm portion 720 extending vertically into the branch pipe 716. The base portion 721 comprises a first base surface facing the service pipe 717, and a second base surface opposite the first base surface. The underground pipe repair device 715 includes an annular body 725 aligned with an opening for the branch pipe 716 and coupled to the second base surface of the T-shaped joint liner 719, the annular body having a physical characteristic. The method includes curing the underground pipe repair device 715 to the joint, applying and curing a liner 718 for the service pipe 717, and determining a position of the annular body 725 based upon detecting the physical characteristic.

The method also includes cutting an opening in the liner 718 of the service pipe 717 aligned with the annular body 725 so that a portion the liner of the service pipe adjacent the opening of the branch pipe 716 is removed. In some embodiments, the robot device 711 may comprise a wireless transceiver configured to communicate with a remote control device. Here, the user would receive an indication that the annular body 725 was detected, and the user would manually operate the cutting tool 714.

In other embodiments, the entire cutting process is automated, and once the robot device 711 detects the annular body 725, the cutting tool 714 is automatically deployed to make the cut in the portion the liner 718 of the service pipe 717 adjacent the opening of the branch pipe 716. In these embodiments, the robot device 711 also includes a memory configured to store a mapping of the annular body 725. In particular, once any part of the annular body 725 is detected, the robot device 711 is configured to map the entirety of the annular body, and store this mapping in the memory. Subsequently, the robot device 711 is configured to operate the cutting tool 714 based upon the stored mapping.

In some embodiments, the annular body 725 comprises a frangible material. In yet other embodiments, the annular body 725 comprises a flat metallic ring, or a flat carbon ring. In these embodiments, the cutting tool 714 may comprise a water jet cutting tool. In some embodiments, the annular body 725 may be omitted. Here, the base portion 821 has physical characteristic to be detected.

Referring now additionally to FIG. 18, another embodiment of the underground pipe repair system 810 is now described. In this embodiment of the underground pipe repair system 810, those elements already discussed above with respect to FIGS. 2 & 5 are incremented by 800 and most require no further discussion herein. The underground pipe repair system 810 is for repairing a joint between a service pipe 817 and a branch pipe 816. The underground pipe repair system 810 illustratively comprises an underground pipe repair device 815 comprising a T-shaped joint liner 819 comprising a base portion 821 extending laterally in the service pipe 817, and an arm portion 820 extending vertically into the branch pipe 816. In this embodiment, the annular body of the prior embodiments is omitted.

The underground pipe repair system 810 illustratively includes a robot device 811 comprising a cutting tool 814, a sensor 851, and a processor 813 coupled to the cutting tool and the sensor. The sensor 851 may comprise one or more of an image sensor, an infrared sensor, or an X-ray sensor.

The processor 813 is configured to cause the robot device 811 to move through the service pipe 817 and determine a position of the branch pipe 816 based upon an input from the sensor 851. In particular, the processor 813 is configured to detect when the backing of a liner 818 of the service pipe 817 is hollow. In some embodiments, the processor 813 is configured to implement a machine learning algorithm to detect a location of the underground pipe repair device 815. For example, the machine learning algorithm may be pre-trained using supervised learning techniques from prior user driven reinstatements.

When the underground pipe repair device 815 location has been determined, the processor 813 is configured to operate the cutting tool 814 to cut an opening in the liner 818 of the service pipe 817 aligned with the branch pipe 816 so that a portion the liner of the service pipe adjacent the opening of the branch pipe is removed. In particular, the cutting tool 814 first makes a puncture cut in the liner 818 of the service pipe 817 at the branch pipe 816, and subsequently uses a dremel cutting tool to cut radially outward to remove adjacent portions of the liner and to reinstate the branch pipe.

In some embodiments, the processor 813 is configured to store a known physical mapping of the underground pipe repair device 815 and map an actual position of the underground pipe repair device based upon the input from the sensor 851 and the stored physical mapping. For example, if the arm portion 820 of the underground pipe repair device 815 has a known diameter of 12 inches, the processor 813 is configured to cut an opening in the liner 818 of the service pipe 817 at the branch pipe 816, the opening having a diameter less than the known diameter of the arm portion 820.

In some embodiments, the arm portion 820 comprises a first arm surface facing the branch pipe 816, and a second arm surface opposite the first arm surface. The second arm surface may be mechanically hardened, for example, with a protective layer, from a lowermost point (i.e. at the meeting with the service pipe 817) and partially upward into the branch pipe 816. Here, the processor 813 is configured to rely less on the known mapping of the underground pipe repair device 815, but rather push the dremel cutting tool radially outward towards the mechanically hardened arm portion 820. Since the arm portion 820 is mechanically hardened, the dremel cutting tool does not damage the branch pipe 816 or the arm portion 820.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An underground pipe repair device for a joint between a service pipe and a branch pipe, the underground pipe repair device comprising:
   a T-shaped joint liner comprising
      a base portion extending laterally in the service pipe, and
      an arm portion extending vertically into the branch pipe, said base portion comprising a first base surface facing the service pipe, and a second base surface opposite said first base surface; and
   an annular body separate from said T-shaped joint liner, aligned with an opening for the branch pipe, and coupled to said second base surface of said T-shaped joint liner;
   said annular body having a detectable device to be detected by a robot device within the service pipe.

2. The underground pipe repair device of claim 1 wherein the detectable device comprises a ferromagnetic device; and wherein said ferromagnetic device comprises a magnetic material carried by said annular body.

3. The underground pipe repair device of claim 1 wherein the detectable device comprises a radio frequency identification (RFID) tag carried by said annular body.

4. The underground pipe repair device of claim 1 wherein the detectable device comprises a device with a known electrical potential.

5. The underground pipe repair device of claim 4 wherein said annular body is coupled to a reference voltage; and wherein the known electrical potential comprises the reference voltage.

6. The underground pipe repair device of claim 1 wherein said T-shaped joint liner comprises a flexible curable layer abutting said second base surface.

7. The underground pipe repair device of claim 1 wherein said annular body comprises portions, each portion having a different color.

8. The underground pipe repair device of claim 1 wherein said annular body comprises a plastic frangible material.

9. The underground pipe repair device of claim 1 wherein said annular body comprises a metallic material.

10. An underground pipe repair system for a joint between a service pipe and a branch pipe, the underground pipe repair system comprising:
an underground pipe repair device comprising
a T-shaped joint liner comprising
a base portion extending laterally in the service pipe, and
an arm portion extending vertically into the branch pipe,
said base portion comprising a first base surface facing the service pipe, and a second base surface opposite said first base surface, and
an annular body separate from said T-shaped joint liner, aligned with an opening for the branch pipe, and coupled to said second base surface of said T-shaped joint liner, said annular body having a detectable device; and
a robot device comprising a cutting tool, and a processor coupled to said cutting tool and configured to
cause said robot device to move through the service pipe,
determine a position of said annular body based upon detecting the detectable device, and
operate said cutting tool to cut an opening in a liner of the service pipe aligned with said annular body so that a portion the liner of the service pipe adjacent the opening of the branch pipe is removed.

11. The underground pipe repair system of claim 10 wherein the detectable device comprises a ferromagnetic device; and wherein said ferromagnetic device comprises a magnetic material carried by said annular body.

12. The underground pipe repair system of claim 10 wherein the detectable device comprises a radio frequency identification (RFID) tag carried by said annular body.

13. The underground pipe repair system of claim 10 wherein the detectable device comprises a device with a known electrical potential.

14. The underground pipe repair system of claim 13 wherein said annular body is coupled to a reference voltage; and wherein the known electrical potential comprises the reference voltage.

15. The underground pipe repair system of claim 10 wherein said T-shaped joint liner comprises a flexible curable layer abutting said second base surface.

16. A method for operating an underground pipe repair system for repairing a joint between a service pipe and a branch pipe, the method comprising:
positioning an underground pipe repair device at the joint, the underground pipe repair device comprising
a T-shaped joint liner comprising
a base portion extending laterally in the service pipe, and
an arm portion extending vertically into the branch pipe,
the base portion comprising a first base surface facing the service pipe, and a second base surface opposite the first base surface, and
an annular body separate from the T-shaped joint liner, aligned with an opening for the branch pipe, and coupled to the second base surface of the T-shaped joint liner, the annular body having a detectable device; and
curing the underground pipe repair device to the joint;
applying and curing a liner for the service pipe;
determining a position of the annular body based upon detecting the detectable device; and
cutting an opening in the liner of the service pipe aligned with the annular body so that a portion the liner of the service pipe adjacent the opening of the branch pipe is removed.

17. The method of claim 16 wherein the detectable device comprises a ferromagnetic device; and wherein the ferromagnetic device comprises a magnetic material carried by the annular body.

18. The method of claim 16 wherein the detectable device comprises a radio frequency identification (RFID) tag carried by the annular body.

19. The method of claim 16 wherein the detectable device comprises a device with a known electrical potential.

20. The method of claim 19 wherein the annular body is coupled to a reference voltage; and wherein the known electrical potential comprises the reference voltage.

* * * * *